United States Patent

Lazarus et al.

Patent Number: 5,374,011
Date of Patent: Dec. 20, 1994

[54] MULTIVARIABLE ADAPTIVE SURFACE CONTROL

[75] Inventors: Kenneth B. Lazarus, Boston; Edward F. Crawley, Cambridge, both of Mass.

[73] Assignee: Massachusetts Institute of Technology, Cambridge, Mass.

[21] Appl. No.: 791,899

[22] Filed: Nov. 13, 1991

[51] Int. Cl.$^5$ .............................................. B64G 5/00
[52] U.S. Cl. ............................ 244/75 R; 244/76 R; 244/195; 310/328
[58] Field of Search ............... 244/75 R, 75 A, 76 C, 244/76 R, 195, 198, 200, 201, 220, 221, 228; 310/800, 328, 326

[56] References Cited

U.S. PATENT DOCUMENTS

| | | | |
|---|---|---|---|
| 4,363,991 | 12/1982 | Edelman | 310/328 X |
| 4,706,902 | 11/1987 | Destaynder et al. | 244/76 C |
| 4,845,357 | 7/1989 | Brennan | 244/75 R |
| 4,849,668 | 7/1989 | Crawley et al. | 310/328 |
| 4,868,447 | 9/1989 | Lee et al. | 310/328 |
| 5,046,358 | 9/1991 | Wolf et al. | 244/75 R X |

OTHER PUBLICATIONS

Javier de Luis, Edward F. Crawley "The Use of Piezo-Ceramics as Distributed Actuators in Flexible Space Structures", Aug. 1985.
Induced Strain Actuation of Isotropic and Anisotropic Plates, Crawley, E. F. and Lazarus, K. B., AIAA Paper No. 89-1326, Proceedings of the 30th SDM Conference, Mobile, Ala., Apr., 1989.
Static Aeroelastic Behavior Of An Adaptive Laminated Piezoelectric Composite Wing, S. M. Ehlers and T. A. Weisshaar. AIAA Paper No. 90-1078-CP May, 1990.
Static Aeroelastic Control Using Strain Actuated Structures, K. B. Lazarus et al. formal paper describing presentation at First Joint U.S./Japan Conference on Adaptive Structures, Nov. 13, 1990, Maui, Hi.
Fundamental Mechanisms of Aeroelastic Control With Control Surface and Strain Actuation, K. B. Lazarus, E. F. Crawley, and C. Y. Lin, Space Engineering Research Center, MIT, Cambridge, Mass. 02139, Copy right AIAA, 1991.

*Primary Examiner*—Margaret A. Focarino
*Assistant Examiner*—Christopher P. Ellis
*Attorney, Agent, or Firm*—Lahive & Cockfield

[57] ABSTRACT

An adaptive sheet structure with distributed strain actuators is controlled by a dynamic compensator that implements multiple input, multiple output control laws derived by model-based, e.g., Linear Quadratic Gaussian (LQG) control methodologies. An adaptive lifting surface is controlled for maneuver enhancement, flutter and vibration suppression and gust and load alleviation with piezoceramic elements located within, or enclosed by sheets of composite material at a particular height above the structure's neutral axis. Sensors detect the amplitudes of lower order structural modes, and distributed actuators drive or damp these and other modes. The controller is constructed from an experimental and theoretical model using conventional control software, with a number of event recognition patterns and control algorithms programmed for regulating the surface to avoid instabilities. The number of control states of the compensator is then reduced by removing states having negligible effects on the plant, and a smaller set of control laws are optimized and then adjusted based on analytical models bench and wind-tunnel testing.

15 Claims, 31 Drawing Sheets

LIST OF SYMBOLS

Variables

| | |
|---|---|
| $a$ | Mid-Chord to E.A. Normalized Distance |
| A, B, C | System, Control, and Output Matrices |
| $b$ | Semi-Chord |
| $C_L, C_M$ | Lift and Moment Coefficient |
| F, M | Strain Actuation Force and Moment |
| $g, \underline{g}, G$ | Feedback Gains (scalar, vector, and matrix) |
| $\bar{h}$ | Normalized plunge variable $h/b$ |
| K | Section Spring Stiffness |
| L, L | Airfoil Span and Disturbance Matrix |
| N | State Space Cost Matrix |
| $p$ | Normalized Laplace Variable $\lambda/w_\alpha$ |
| $\bar{q}$ | Normalized Dynamic Pressure |
| $R_\alpha$ | Radius of Gyration |
| $u$ | Normalized Control Variable |
| $U_\alpha$ | Normalized Wind Speed $U/(w_\alpha b)$ |
| $w$ | Uncoupled Natural Frequency |
| $\bar{w}_h$ | Bending to Torsion Frequency Ratio $w_h/w_\alpha$ |
| $x_\alpha$ | E.A. to C.G. Normalized Distance |
| $x_s$ | E.A. to Sensor Normalized Distance |
| x, y, z | State, Output, and State Cost Vectors |
| $\alpha$ | Pitch Degree of Freedom |
| $\alpha_o$ | Free Stream Airflow Disturbance Angle |
| $\beta$ | Trailing Edge Flap Rotation Angle |
| $\lambda$ | Laplace Variable |
| $\Lambda$ | Actuation Strain |
| $\Phi$ | Laplace Transform of the State Transition Matrix $(pI-A)^{-1}$ |
| $\mu$ | Mass Density Ratio |
| $\xi$ | Leading Edge Flap Rotation Angle |

Subscripts

| | |
|---|---|
| $h$ | Associated with Plunge or Bending |
| $\alpha$ | Associated with Pitch or Torsion |
| $\beta$ | Associated with the Trailing Edge Flap |
| $\xi$ | Associated with the Leading Edge Flap |

Fig. 14

| Parameter | Symbol | Value |
|---|---|---|
| Section Geometry | $a$ | $-0.2$ |
| | $x_\alpha$ | $0.2$ |
| | $R_\alpha^2$ | $0.25$ |
| | $\mu$ | $20$ |
| | $\overline{w}_h$ | $0.2$ |
| Wing Parameters | $\dfrac{t}{2b}$ | $\cong 1\%$ |
| | $\dfrac{L}{b}$ | $3.92$ |
| Steady Aerodynamic Coefficients | $C_{L_\alpha}$ | $2\pi$ |
| | $C_{M_\alpha}$ | $1.885$ |
| | $C_{L_\beta}$ | $2.487$ |
| | $C_{M_\beta}$ | $-0.334$ |
| | $C_{L_\xi}$ | $-0.087$ |
| | $C_{M_\xi}$ | $-0.146$ |
| State Cost Matrix | $N_{hh}$ | $(1/0.406)^2$ |
| | $N_{\alpha\alpha}$ | $(1/0.282)^2$ |
| Control Cost Matrix | $R_{hh}$ | $(1/0.0429)^2$ |
| | $R_{\alpha\alpha}$ | $(1/0.0215)^2$ |
| | $R_{\beta\beta}$ | $(1/0.0873)^2$ |
| | $R_{\xi\xi}$ | $(1/0.0436)^2$ |

Fig. 15A

| Mode Number | Shape Number | Experiment (Hz) | Ritz (Hz) | Error |
|---|---|---|---|---|
| 1 | 1B | 7.44 | 7.79 | +4.7% |
| 2 | 1T | 36.6 | 36.0 | -1.4% |
| 3 | 2B | 49.5 | 50.4 | +1.8% |
| 4 | 2T | 117 | 122 | +3.9% |
| 5 | 3B | 143 | 149 | +4.0% |
| 6 | 1C | 204 | 185 | -9.3% |
| 7 | 3T | 223 | 235 | +5.4% |
| 8 | 4B | 283 | 298 | +5.3% |
| 9 | 4T | 370 | 390 | +5.4% |
| 10 | 5B | | 498 | . |

Fig. 26

MULTIVARIABLE ADAPTIVE SURFACE CONTROL

BACKGROUND OF INVENTION

The present invention relates to the behavior of plate or sheet structures in changing conditions, for example, in a fluid flow, and control of such behavior. Perhaps the most developed body of related art is the study of aerodynamic structures such as aircraft wings, for which detailed models of lifts, loading, flutter control, gust alleviation and the like have been developed for a variety of wing shapes and articulated control systems under a commonly experienced range of conditions. Aileron-controlled wings, however are relatively heavy and unresponsive structures with rather low-bandwidth control systems.

Some current and many future space vehicle and aircraft performance criteria demand light weight flexible structures, such as solar arrays, signal collectors, antennae, mirrors, and lifting surfaces, formed of generally plate-like structures. Structural integrity and mission requirements of these plate-like components of aerospace vehicles also demand low vibration and load levels. Due to these conflicting specifications there exists a need for high-authority, high-bandwidth control systems to be incorporated into and implemented on such plate-like structures.

In the past, it has been suggested that certain structural elements, such as plates or trusses, may incorporate piezoelectric elements actuated to alter the stiffness and suppress an unwanted resonance.

More recently, applicants and others have made various measurements or models relating the performance or weight penalties of distributed actuators for achieving desirable structural properties, for example, induced bending or twisting, of a wing. Thus, at this point it is well recognized that the inclusion of piezoelectric elements in a wing surface is feasible, and the effects of including such elements on basic mechanical properties such as length, stiffness or the like can be quantified. However, there does not appear to have been constructed a control system for performing complete control of a plate structure in a real environment.

It would be desirable to have an effective compensator for controlling an adaptive surface structure such as a lifting surface.

SUMMARY OF THE INVENTION

An adaptive composite structure with distributed surface-mounted or embedded strain actuators, e.g., piezoceramics, is controlled with high authority and high bandwidth by a dynamic compensator that implements multiple input, multiple output control laws. The compensator is constructed implementing modern model-based, e.g., Linear Quadratic Gaussian (LQG) control methodologies. In one embodiment, the controlled plate-like structure is an adaptive lifting surface, which is controlled for maneuver enhancement, flutter and vibration suppression and gust and load alleviation. Adaptive lifting surfaces with distributed strain actuators offer improvements over conventional aileron-controlled wings in regard to effectiveness at high dynamic pressures and servo motor bandwidths. A particularly effective construction with thin piezoceramic sheets has the sheets located within, or enclosed by sheets of structural material at a particular height above the neutral axis.

In one prototype system, sensors are distributed to detect the amplitudes of a plurality of lower order modes, and the piezoceramic actuators are located to drive or damp these and other modes. A controller is constructed using conventional aerodynamic control software, into which a number of event recognition patterns and corresponding simple control algorithms have been programmed for regulating the surface to avoid unstable states. The number of control states of the compensator is then reduced by removing states having negligible effects on the plant, and a small set of control laws are developed and optimized based on quadratic cost function and linear quadratic Gaussian optimation. The control laws are then adjusted based on bench and wind-tunnel testing, to produce a dynamic compensator.

BRIEF DESCRIPTION OF DRAWINGS

These and other aspects of the invention will be understood from the description which follows, taken together with the drawings, wherein;

FIG. 14 is a table of definitions of symbols employed in the analysis of typical sections as described herein;

FIG. 15A is a table of nominal geometric and material properties of a prototype system;

FIG. 26 is a table of measured and predicted poles and zeros of the article of FIG. 25;

FIG. 32 illustrates a sail, panel or antenna in accordance with the present invention.

DETAILED DESCRIPTION

Figure 1A:
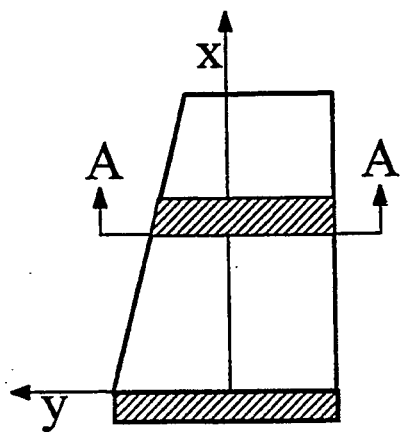
FIGS. 1A-1C illustrate typical sections used to develop models of strain actuation of real structures.

The present invention is a system including a sheet structure, such as the skin of an aircraft wing, and a closed loop control system therefor, and is characterized in that the sheet structure has a plurality of actuators that couple strain energy into the sheet for effective physical control, and the control system includes a compensator that receives sensing signals and operates in accordance with a model of machine states to drive selected ones of the actuators so that the sheet structure is well regulated in its operating environment. The invention also includes particular sheet structures having actuators placed for optimal effectiveness.

Certain details of the mechanics of fabricating wings or sheet structures to incorporate distributed sensors or actuators have been published before, for example in U.S. Pat. No. 4,849,668 of Edward F. Crawley and Javier de Luis, and in various research reports and engineering papers, and are assumed to be generally known. The present invention involves developing useful systems including a controller for such structures, as well as optimizing the construction of the individual sheet structures and controller so that they operate effectively, and in fact outperform, in certain areas, conventional wing or sheet structures.

Overall, the construction of an operating system according to the present invention is achieved by performing a mathematical modelling and theoretical analysis of a distributed strain-actuated sheet structure, the practical construction of individual plates of such a structure and bench or wind-tunnel testing to verify the sensing and control aspects of the corresponding real structure, the development of a multi-state compensator that receives sensing signals and drives actuators affixed to the structure so as to regulate the behavior of the real structure, and the elimination of insignificant states of the model to produce an effective lower order real-time controller of high bandwidth.

The construction of a prototype system according to the invention will be discussed below, with attention paid to each step of the construction in the above-recited order. For the initial part of the disclosure, estimating the efficiency of distributed actuators for controlling various modes of a sheet structure, the following papers and conference proceedings provide a reference base for background considerations and definitions or elaboration of the basic terminology.

TECHNICAL REFERENCES

Ashton, J. E. and Whitney, J. M., *Theory of Laminated Plates,* Technomic Publishing Company, 1970.

Atluri, S. N. and Amos, A. K., ed., *Large Space Structures: Dynamics and Control,* Springer, Verlag, 1988.

Bisplinghoff, R. L., Ashley, H. and Halfman, R. L., *Aeroelasticity,* Addison-Wesley, 1955.

Burke, S. and Hubbard, J. E., "Active Vibration Control of a Simply-Supported Beam Using a Spatially Distributed Actuator," *IEEE Control Systems Magazine,* Vol. 7, No. 6, 1987.

Chen, L., Rogers, C. L., and Jia, J., "Behavior of SMA Reinforced Composite Plates, Part I and II," Proceedings of the 30th SDM, Mobile, Ala., Apr. 1989.

Chiarappa, D. J. and Claysmith, C. R., "Deformable Mirror Surface Control Techniques," *J. of Guidance and Control,* Vol. 4, No. 1, 1981.

Crawley, E. F. and de Luis, J., "Use of Piezoelectric Actuators as Elements of Intelligent Structures," *AIAA Journal,* Vol. 25, No. 10, 1987.

Crawley, E. F. and Dugundji, J., "Frequency Determination and Non-Dimensionalization for Composite Cantilever Plates," *Journal of Sound and Vibration,* Vol. 72, No. 1, 1980, pp. 1–10.

Crawley, E. F. and Lazarus, K. B., "Induced Strain Actuation of Isotropic and Anisotropic Plates," AIAA Paper No. 89-1326, Proceedings of the 30th SDM Conference, Mobile, Ala., Apr. 1989.

Crawley, E. F., Warkentin, D. J., and Lazarus, K. B., "Feasibility Analysis of Piezoelectric Devices," Space Systems Laboratory, Massachusetts Institute of Technology, Cambridge, Mass., Rept. MIT-SSL No. 5–88, Jan., 1988.

Fanson, J. L., Blackwood, G. H., and Chu, C-C., "Active-Member Control of Precision Structures," AIAA Paper No. 89-1329, Proceedings of the 30th SDM Conference, Mobile, Ala., Apr., 1989.

Forward, R. L. and Swigert, C. J., "Electronic Damping of Orthogonal Bending Modes in a Cylindrical Mast-Theory," *J. of Spacecraft and Rockets,* Jan.-Feb., 1981.

Hagood, N. W. and Crawley, E. F., "Experimental Investigation into Passive Damping Enhancement for Space Structures," AIAA Paper No. 89-3436, presented at the AIAA Guidance, Navigation, and Control Conference, Boston, Mass., Aug. 1989.

Hanagud, S., Obal, M. W., and Meyyappa, M., "Electronic Damping Techniques and Active Vibration Control," AIAA Paper No. 85-0752, Proceedings of the 26th SDM Conference, Apr. 1985.

Jensen, D. W. and Crawley, E. F., "Comparison of Frequency Determination Techniques for Cantilevered Plates with Bending-Torsion Coupling," *AIAA Journal,* Vol. 22, No. 3, 1984.

Jones, R. M., *Mechanics of Composite Materials,* Scripta Book Company, Washington, D.C., 1975.

Lee, C-C. and Moon, F. C., "Laminated Piezopolymer Plates for Torsion and Bending Sensors and Actuators," *J. Acoustical Society of America,* Vol. 85, No. 6, Jun., 1989.

Meirovitch, L. and Kwak, M. K., "Convergence of the Classical Rayleigh-Ritz Method and the Finite Element Method," *AIAA Journal,* Vol. 28, No. 8, Aug. 1990, pp. 1509–1516.

Moore, B. C., "Principal Component Analysis in Linear System: Controllability, Observability, and Model Reduction," *IEEE Transactions on Automatic Control,* AC-26, 1981, pp. 17–31.

Noll T. E., "Aeroservoelasticity," AIAA Paper No. 90-1073, Proceedings of the AIAA/ASME/ASCE/AHS/ASC 31st Structures, Structural Dynamics, and Materials Conference, Long Beach, Calif., Apr., 1990, pp. 1560–1570.

Redeker, G., Wichmann, G., and Oelker, H-C., "Aerodynamic Investigations Toward an Adaptive Airfoil for a Transonic Transport Aircraft," *J. Aircraft,* Vol. 23, No. 5, May, 1986.

Rogers, W. A., Braymen, W. W., Murphy, A. C., Graham, D. H., and Love, M. H., "Validation of Aeroelastic Tailoring by Static Aeroelastic and Flutter Tests," AFWAL-TR-81-3160, Sep., 1982.

Wada, B. K., Fanson, J. L., and Crawley, E. F., "Adaptive Structures," Proceedings of the ASME Winter Annual Meeting, San Francisco, Calif., Dec., 1989.

Weisshaar, T. A. and Foist, B. L., "Vibration Tailoring of Advanced Composite Lifting Surfaces," *J. Aircraft,* Vol. 22, No. 2, Feb., 1985.

Liebst, B. S., Garrard, W. L., and Adams, W. M., "Design of an Active Flutter Suppression System," *J. Guidance,* Jan.–Feb., 1986.

Mahest, J. K., Stone, C. R., Garrard, W. L. and Dunn, H. J., "Control Law Synthesis for Flutter Suppression Using Linear Quadratic Gaussian Theory," *J. Guidance and Control*, Jul.-Aug., Vol. 4, No. 4, 1981.

Miller, D. W., Jacques, R. N. and de Luis, J., "Typical Section Problems for Structural Control Applications," AIAA Paper No. 90-1225, Proceeding of the AIAA Dynamic Specialists Conference, Long Beach, Calif., Apr. 5-6, 1990.

Mukhopadhyay, V., Newsom, J. R., and Abel, I., "Reduced-Order Optimal Feedback Control Law Synthesis for Flutter Suppression," *J. Guidance and Control*, Jul.-Aug., Vol. 5, No. 4, 1982.

Newsom, J. R., "Control Law Synthesis for Active Flutter Suppression Using Optimal Control Theory," *J. Guidance and Control*, Sep.-Oct., Vol. 2, 1979.

Newsom, J. R., Pototzky, A. S., and Abel, I., "Design of a Flutter Suppression System for an Experimental Drone Aircraft," *J. Aircraft*, Vol. 22, No. 5, 1985.

Noll, T., Perry, B. III, Tiffany, S., and others, "Aeroservoelastic Wind-Tunnel Investigation Using the Active Flexible Wing Model-Status and Recent Accomplishments," presented at the 30th Structures, Structural Dynamics and Materials Conference, Mobile, Ala., Apr., 1989.

Ohta, H., Fujimori, A., Nikiforuk, P. N. and Gupta, M. M., "Active Flutter Suppression for Two-Dimensional Airfoils," *J. Guidance*, Mar.-Apr., Vol. 12, No. 2, 1989.

Pan, W., Zhang, Q., Bhalla, A., and Cross, L. E., "Field-Forced Antiferroelectric-to-Ferroelectric Switching in Modified Lead Zirconate Titanate Stannate Ceramics," *J. American Ceramic Society*, Vol. 72, No. 4, 1989, pp. 571-578.

Perry, B. III, Mukhopadhyay, V., Hoadley, S. T., and others, "Digital-Flutter-Suppression-System Investigations for the Active Flexible Wing Wind-Tunnel Model," AIAA Paper No. 90-1074, Proceeding of the 31st SDM Conference, Long Beach, Calif., May, 1990.

Theodorsen, T. and Garrick, I. E., "Nonstationary Flow About a Wing-Aileron-Tab Combination Including Aerodynamic Balance," NACA, Report No. 736, 1942.

Tiffany, S. H. and Karpel, M., "Aeroservoelastic Modeling and Applications Using Minimum-State Approximations of the Unsteady Aerodynamics," presented at the 30th Structures, Structural Dynamics and Materials Conference, Apr. 1989.

Zeiler, T. A. and Weisshaar, T. A., "Integrated Aeroservoelastic Tailoring of Lifting surfaces," *AIAA Journal*, Jan., 1988.

The following symbols will be used in the text below.

Variables

A Extensional Stiffness
B Coupling Stiffness
c Chord
Cl Lift Coefficient
D Bending Stiffness
E Elastic Modulus
I Beam Area Moment Of Inertia
L Semi-Span
M Moment Per Unit Length
N Force Per Unit Length
Q Reduced Stiffness
S Wing Section Area
t Plate Thickness
w Out Of Plane Displacement
Z Distance from Neutral Axis Greek $\epsilon$ Induced Strain
$\kappa$ Induced Curvature
$\Lambda$ Actuation Strain
$\rho$ Density
$\psi$ Relative Stiffness Ratio
$\psi_D$ Bending/Twist Coupling Parameter
$\theta$ Induced Twist Subscripts a Actuator
i Wing Section Subdivision
L Longitudinal (spanwise) dimension
m Distance from neutral axis to middle plane
s Substrate (Wing Skin)
T Transverse (chordwise) dimension

PART I—MATHEMATICAL MODELLING AND ANALYSIS

In the following analysis several assumptions are made in order to gain insight into the problem of obtaining the maximum static aeroelastic control authority from an induced strain actuated structure, while minimizing the weight added. The assumptions used greatly simplify the mathematics, which yields a model that retains the fundamental physics involved in deforming a lifting surface, while providing useful results which can be applied to the design of actual strain actuated adaptive airfoils. Specifically, the simplified model, referred to as the deformable typical section, is used to obtain closed form solutions for optimal actuator placement and size, and optimal and suboptimal induced camber and twist. Although many effects which are important for detailed modelling, such as those produced by the plate boundary conditions at the root, are omitted; the objectives of this first order analysis are well served by the deformable typical section model.

Figure 1B:
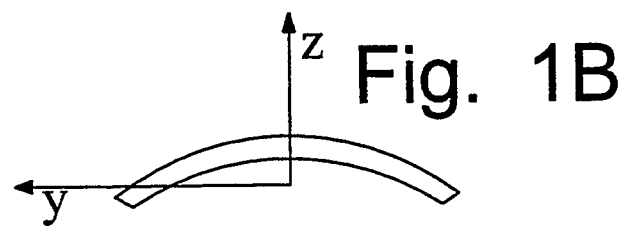
Figure 1C:
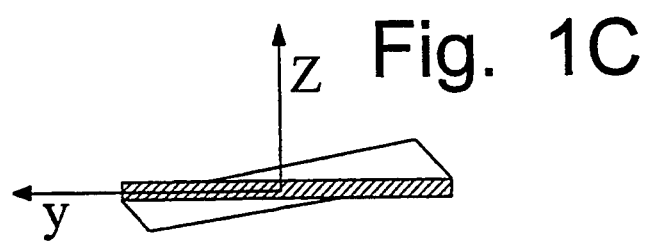

FIG. 1 shows a cantilevered plate-like aeroelastic lifting surface, and a representative segment, referred to as the deformable typical section, of the wing. The section is considered deformable because it is free to bend along the chord (induced camber actuation) as well as twist along the span (induced twist actuation) as shown in the FIGURE. The section is considered typical since it has uniform geometric and material properties which are representative of the entire lifting surfaces, as does a conventional typical section. Each section is assumed to have an elastic axis which coincides geometrically with both the mid-plane and the mid chord, and is symmetric about these planes.

The governing equations for the deformable typical section are found by applying Bernoulli-Euler beam or Kirchhoff plate theory, and including the effects of the strain actuation as done in Crawley and de Luis [1987] and Crawley and Lazarus [1989]. These relations are used to find the induced chordwise bending (camber) or spanwise twist (angle of attack) induced in the deformable section by the strain actuators. The optimal actuator placement and size relations are found by matching the structural stiffness of the wing skin and the actuator layer. The deformations induced in sections with optimally placed actuators are also found.

In the analysis which follows, the governing relations for both camber and twist control are developed. In addition, a procedure is outlined for the design of a nominal strain actuated airfoil, and for comparison of such an airfoil with a conventional control surface actuated wing in terms of control authority and weight penalty associated with the actuator system. This procedure will be used in the trade studies of Part II to compare induced strain actuation with conventional control methods.

Structural Optimization For Camber Control

For the purpose of analyzing camber control the deformable section is assumed to act like a beam bending along the chord when actuated by induced strain actuator layers distributed symmetrically about the neutral axis and acting in opposition. In this configuration the chordwise bending of the section is governed by the following moment curvature relation $$\left(\frac{EI}{L_i}\right)_y \frac{\partial^2 w}{\partial y^2} = (m_\lambda)_y \tag{1}$$

where $L_i$ is the length of the deformable section along the span, and $m_\lambda$ is the equivalent actuation moment per unit length developed by the induced strain actuators which causes the structure to deform. This equivalent moment is equal to the integral though the wing thickness of the product of the actuation strain $\lambda$, Young's Modulus E, and the offset from the neutral axis z $$(m_\lambda)_y = \int_z E \lambda_y z \, dz \tag{2}$$

Figure 2:
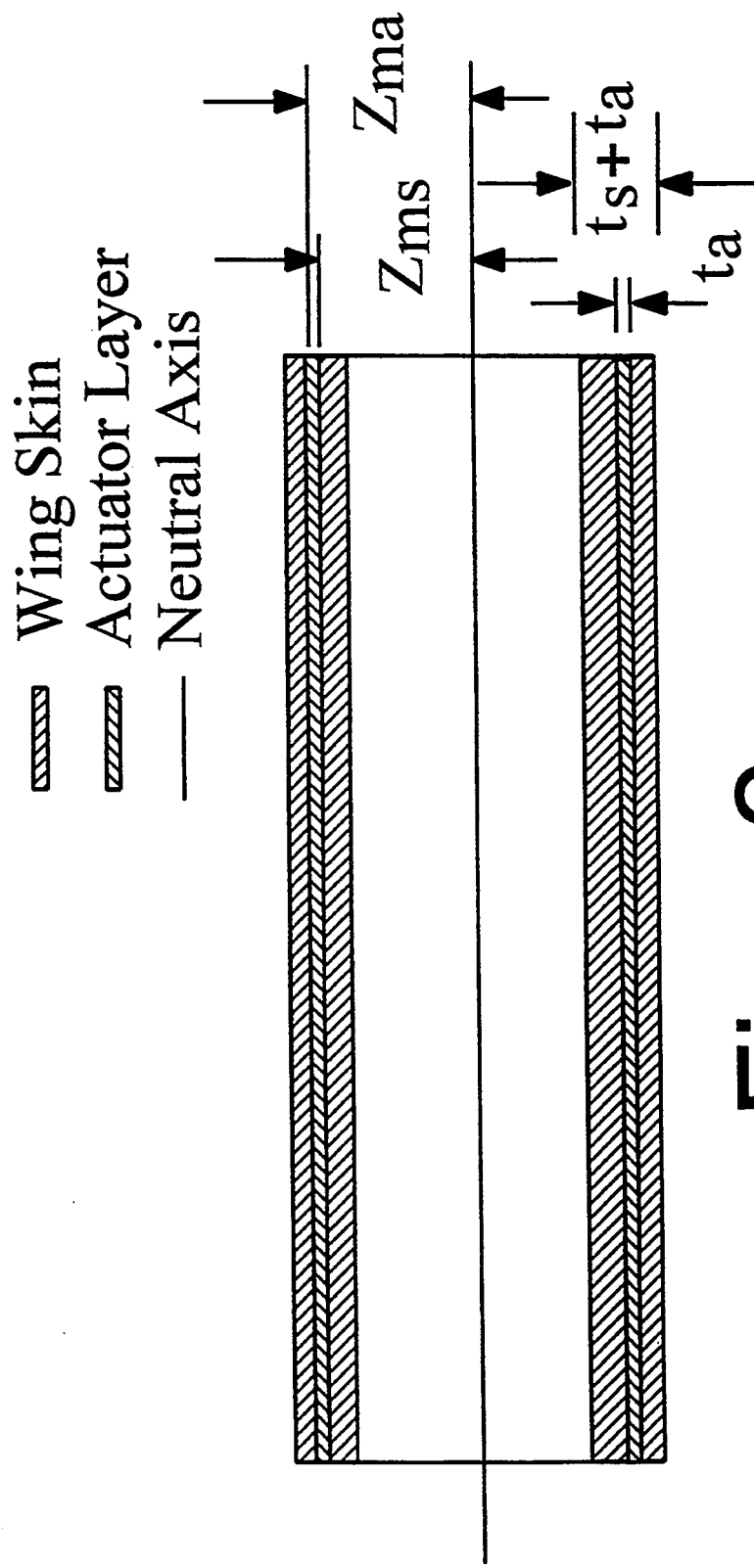
FIG. 2 illustrates general actuator placement in a box wing structure.

The wing stiffness and equivalent actuation moment developed are determined by the internal geometry of the lifting surface. FIG. 2 shows the box wing geometry analyzed in this study. The section is assumed to be made up of two wing skins, a layer of distributed strain actuators, and a hollow core. The wing skins are of identical thickness. One lies above, and one lies below the neutral axis. Each skin is equidistant from the neutral axis and includes a layer of distributed induced strain actuators. The wing skin and actuator thickness ($t_a$ plus $t_s$) is assumed to be much less than its distance from the neutral axis to the center of the skin ($Z_{ms}$) or actuator ($Z_{ma}$). The hollow core between the wing skins is assumed to be composed only of a perfect (and weightless) shear web.

Applying the above assumptions, the chordwise bending stiffness, or mechanical impedance, of the lifting surface is found to come from only the wing skins and the induced strain actuator layers $$\left(\frac{EI}{b}\right)_y = 2[E_s t_s Z_{ms}^2 + E_a t_a Z_{ma}^2] \tag{3}$$

for $$t_s, t_a < < Z_{ms}, Z_{ma}$$

Substituting the equivalent moment (Eq. 2) and the mechanical impedance (Eq. 3) into the moment curvature relation (Eq. 1) yields an expression for the induced curvature $$\kappa_y = \frac{E_a t_a Z_{ma} \Lambda}{E_a t_a Z_{ma}^2 + E_s t_s Z_{ms}^2} \tag{4}$$

where the induced strain actuators, located an equal distance from the neutral axis, are operated in opposition to induce curvature in the structure along the chordwise dimension. Inducing such a curvature is equivalent to changing the camber of the lifting surface. Rearranging Eq. 4, the induced camber is found to depend on the distance of the wing skin $Z_{ms}$ and the actuator layer $Z_{ma}$ above the neutral axis, and the wing skin and the actuator layer stiffness $$\kappa_y = \frac{Z_{ma} \Lambda}{Z_{ma}^2 + \psi Z_{ms}^2} \quad \psi = \frac{E_s t_s}{E_a t_a} \tag{5}$$

where $\psi$ is the relative stiffness of the wing skin to the induced strain actuator.

Upon close examination of the induced camber equation (Eq. 5), it can be seen that the amount of camber obtainable through induced strain actuation is maximized by correctly matching the bending stiffness, or mechanical impedance, of the wing skin and that of the distributed actuator layer. If the actuator layer is placed at a distance above the neutral axis that is less than that which yields maximum effectiveness, it is force limited. On the other hand, and actuator which lies a greater distance from the neutral axis than the distance which gives maximum effectiveness is stroke limited.

The optimal actuator layer height, which is found by differentiating the expression for the induced camber (Eq. 5) by the distance the actuator layer lies above the neutral axis $Z_{ma}$, is $$Z_{ma} = \sqrt{\psi} \, Z_{ms} \tag{6}$$

Equation 6 shows that the optimal position for the distributed actuator layer is only dependent on $\psi$, the relative stiffness of the wing skin and the actuator layer. This expression, which relates the optimal actuator layer height to the geometrical and material properties of the wing, can be used in two ways. First, the optimal actuator size can be found for a given actuator layer. In some cases the actuator placement will be fixed by other constraints, and the actuator thickness can be chosen to achieve an optimal configuration. Equation 6 was utilized in this manner in the trade studies of Part II. Alternatively, it may be desirable to locate the optimal location of a given actuator. Since the actuator layer must be physically connected to the airfoil, the height of this layer above the neutral axis $Z_{ma}$ must be roughly equal to or less than the height of the wing skin $Z_{ms}$. Thus for practical optimal designs to be achieved, the relative stiffness ratio must be less than or equal to one.

However the relative stiffness ratio is typically greater than unity for actuators bonded to structural members such as wing skins. This indicates that it may not be possible to achieve optimal designs, and that Zma should be made as large as physically possible by bonding the actuator layer to the interior or exterior wing skin surface, or embedding it in the skin. It also indicates that the actuator stiffness $E_a$ should be chosen as large as possible. The high relative stiffness ratio of representative wings typically causes suboptimal actuation in a force limited mode even when $Z_{ma}$ and $E_a$ are large.

Sections with actuators placed according to Eq. 6 are considered optimal since it is in this configuration that the maximum camber is obtained through induced strain actuation for a given airfoil section and actuator. A non-dimensional expression for the optimal induced camber is found by substituting the optimal actuator placement expression (Eq. 6) into the camber equation (Eq. 5) and integrating over the chord $$\left(\frac{\Delta w}{c}\right)_{opt} = \frac{1}{2} \sqrt{\frac{1}{\psi}} \left[\frac{c}{2Z_{ms}}\right] \Lambda \quad (7)$$

where $$\frac{2Z_{ms}}{c} \simeq \text{Thickness Ratio}$$

The optimal induced camber is a function of just three non-dimensional quantities. These quantities are the inverse square root of the relative stiffness ratio $\psi$, the inverse of the airfoil thickness ratio, and the actuation strain $\Lambda$ produced by the induced strain actuators. Equation 7 shows that more camber is induced if the airfoil is thin, the relative stiffness ratio is kept small ($Z_{ma}$ and $E_a$ large), and if the actuation strain is large.

Structural Optimization for Twist Control

In addition to camber control, induced twist regulation can be used for aeroelastic control. By inducing twist curvature in the lifting surface, the local airfoil angle of attack may be regulated to effect control. A deformable typical section analysis can be employed, in a manner similar to the camber control case, to determine the equations governing the transfer of actuation strain to twist curvature. In this analysis the deformable section is assumed to act like a plate twisting along the spanwise dimension.

The deformable plate section is assumed to bend, twist and extend along the spanwise dimension, as well as exhibit chordwise bending. The moment curvature relation for such a section is [Lazarus and Crawley, 1989]

$$\begin{bmatrix} A & B \\ B & D \end{bmatrix} \begin{Bmatrix} \epsilon \\ \kappa \end{Bmatrix} = \begin{bmatrix} N_\Lambda \\ M_\Lambda \end{bmatrix} \quad (8)$$

$$N_\Lambda = \int_z Q \Lambda dz$$

$$M_\Lambda = \int_z Q \Lambda dz$$

where A, B, and D are the plate extension, coupling and bending stiffnesses, $N_\Lambda$ and $M_\Lambda$ are the actuation force and moment per unit length, and Q is the reduced stiffness of the plate section. Note that the extension, coupling and bending stiffnesses are composed of terms from both the wing skins and actuator layers, which lie symmetrically about the neutral axis; while the actuation forces and moments depend only on the strain actuator layer properties.

Equation 8 can be simplified by neglecting the extension $\epsilon_y$ and $\kappa_{yy}$ along the chordwise dimension. Further, the twisting force $(N_\Lambda)_{xy}$ and moment $(M_{80})_{xy}$ created by the strain actuators can be set to zero since common induced strain actuators produce no shear strain. These assumptions allow for the twist curvature, which will be analyzed for induced twist regulation though bending/twist coupling and induced twist regulation though extension/twist coupling, to be solved for explicitly. In each case the internal geometry will be assumed to be that of the box wing (FIG. 2).

Twist Regulation Through Bending/Twist Coupling

When the distributed actuators are commanded to act in opposition, so that a spanwise bending moment $(M_\lambda)_x$ is imposed on the deformable section, a twist curvature is induced through the section bending/twist coupling ($D_{16}$). This twist curvature can be found by setting the coupling stiffness B to zero and applying the aforementioned assumptions to Eq. 8

$$\kappa_{xy} = -\frac{D_{16}}{[D_{11}D_{66} - D_{16}^2]} 2(E_L)_a t_a Z_{ma} \Lambda_x \quad (9)$$

where $(E_L)_a$ is the engineering constant associated with the elastic modulus of the actuator layer in the longitudinal (spanwise) direction.

Maximum twist curvature, induced angle of attack, and the optimal actuator layer placement is found by differentiating Eq. 9 with respect to the actuator layer height and setting the result equal to zero. This yields a quadratic expression in $Z_{ma}$. A rough approximation for the optimal height of the actuator layer is obtained using a binomial expansion $$Z_{ma} \simeq \sqrt{\psi \frac{(1 - \psi_D^2)}{1 + \frac{(E_L)_s(G_{LT})_a}{(E_L)_a(G_{LT})_s}}} Z_{ms} \quad (10)$$

where $$\psi_D = \frac{D_{16}}{\sqrt{D_{11}D_{66}}}$$

In Eq. 10 $E_L$ and $G_{LT}$ are the engineering constants associated with the elastic and shear modulus of the wing skin and actuator layer. The relation above shows that the optimal actuator height is proportional to the distance the skin lies above the neutral axis and the square root of the relative stiffness ratio, as was found for camber control. In addition, the optimal position for twist control is dependent on the bending/twist coupling parameter $\psi_D$, and the engineering constants of the wing skin and actuator layer. The bending/twist coupling parameter is a non-dimensional measure of the amount of coupling inherent in the wing skin, and has a value between one and negative one [Weisshaar and Foist, 1985]. This parameter, along with the ratio of engineering constants, causes the optimal height for this case to be lower then that of the induced camber case.

A measure of the maximum lift obtained through induced twist can be found by substituting the optimal height equation (Eq. 10) into the twist curvature relation (Eq. 9) and integrating over the section. This gives an expression which shows the dependence of the induced twist, from the inner to the outer spanwise edge of the section, on the geometric and material properties of the lifting surface.

$$\theta \propto \left(\frac{L_i}{c}\right) \frac{\psi_D}{\sqrt{\psi(1 - \psi_D^2)}} \frac{1}{\sqrt{1 + \frac{(E_L)_s(G_{LT})_a}{(E_L)_a(G_{LT})_s}}} \left(\frac{c}{2Z_{ms}}\right) \Lambda_x \quad (11)$$

where $L_i$ is the length of the deformable section. This optimal twist expression is slightly more complicated but very similar to the optimal induced camber equation (Eq. 7). The optimal twist is dependent on the same quantities as was the optimal induced camber, such as the relative stiffness $\psi$, the thickness ratio, and the actuation strain $\lambda$. However, in this case the section aspect ratio, the bending/twist coupling parameter $\psi_D$, and the ratio of engineering constants are also important.

Twist Regulation Through Extension/Twist Coupling

The second method of inducing twist is through extension/twist coupling and extensional actuation. In this analysis, typical plate sections with extension/twist coupling, but no extension/bending coupling, are considered. The actuators on either side of the neutral axis are commanded to act in unison, rather than in opposition, to produce extensional strains and equivalent extensional forces. Therefore spanwise twist is induced in the sections without either chordwise or spanwise bending.

The twist induced from extension actuation and extension/twist coupling is governed by the following relation [Lazarus and Crawley, 1989]

$$\kappa_{xy} = -\frac{B_{16}}{[A_{11}D_{66} - B_{16}^2]} (N_\lambda)_x \quad (12)$$

In Eq. 12, $B_{16}$ is the extension/twist coupling of the wing skin, and $(N_\lambda)_x$ is the equivalent extensional force per unit length developed along the spanwise dimension by the strain actuator layers.

Since twist is induced by an equivalent force (and extension/twist coupling), rather than an equivalent moment (and bending/twist coupling), the actuator layer has no optimal position above the neutral axis. Hence, the maximum twist induced in the lifting surface is independent of the actuator layer placement (as long as it is symmetric). However, there is still an impedance matching problem to consider since the actuator provides both forcing and stiffness. By differentiating the twist curvature equation (Eq. 12) by the actuator thickness $t_a$, the optimal actuator layer thickness is found $$t_a = \sqrt{\frac{(EL)_s(G_{LT})_s}{(EL)_a(G_{LT})_a}} \frac{Z_{ms}}{Z_{ma}} t_s \quad (13)$$

Equation 13 shows that the optimal thickness is dependent essentially on the ratio of the extensional stiffness of the wing skin and the distributed actuator layer, or mechanical impedance, as expected. The optimal induced twist curvature can be found by substituting the optimal actuator thickness expression (Eq. 13) back into the expression for induced twist through extension/twist coupling (Eq. 12). An expression for the optimal induced twist can be found by integrating over the lifting surface as done for the bending/twist coupling case.

Strain Actuator Design and Associated Weight Penalty

Up to this point, the analysis has concentrated on formulating relations for a deformable typical section of an adaptive wing with a box wing internal geometry. Relations for the induced camber and twist and equations governing the optimal actuator placement and optimal induced camber and twist were derived. In this section a method is developed which utilizes the deformable typical section results to design and analyze a strain actuated adaptive wing. The reason for developing this methodology is to establish a metric for the lift generated by, and the weight penalty associated with, a strain actuation system. Such a metric can be used to compare the effectiveness of using strain actuators for static aeroelastic control with that achieved by conventional articulated surface systems.

The internal geometry of an adaptive airfoil is modelled quite well by the box wing described earlier, since its design is essentially one with a hollow core, a wing skin which bears all bending, torsional, and extensional loads, and a substructure that is used mainly for hard point attachment and shear load transfer. However, while the elastic axis generally coincides with the midplane, it does not necessarily lie along the mid-chord, and the wing structural properties are not uniform over the entire lifting surface. Thus, no section can be considered typical. Therefore, in the analysis which follows, the wing is divided into chordwise and spanwise sections, much like those of a box or panel aerodynamic method. Within the sections, the structural properties are averaged and considered uniform. The strain actuators for each section are then designed separately using the deformable typical section relations found above.

After the induced deformations of each section are determined, the aggregate wing induced shape can be calculated. The complete wing shape is found by enforcing the position and slope boundary conditions, while neglecting the higher derivative boundary conditions associated with forces and moments. This method is depicted graphically in FIG. 3. For induced camber actuation, the chordwise slope of each section is found by averaging the integral of the bending curvature $\kappa_{xy}$ of each section along the chord. The positions and slopes of adjacent chordwise sections are then matched, and the angle of attack of the section which lies on the neutral axis is set to zero. In the case of induced twist, the angle of attack of each section is calculated by averaging the integral of the twist curvature $\kappa_{xy}$ of each section along the span. The displacements and chordwise slopes are then matched for adjacent spanwise sections on the elastic axis. Finally, the displacements are matched at the interface between adjacent chordwise sections.

It should be noted that the method described above is approximate, especially in the camber calculations because of the cantilever condition at the root. On the other hand, the cantilever boundary condition at the root has little effect on the wing twist. However, the reader must bear in mind that this study is intended to determine order of magnitude feasibility, trends and design parameters. For the purpose of designing actual structures, a full Rayleigh-Ritz or Finite Element Analysis should be undertaken.

Actuator Layer Placement and Thickness

Figure 4:
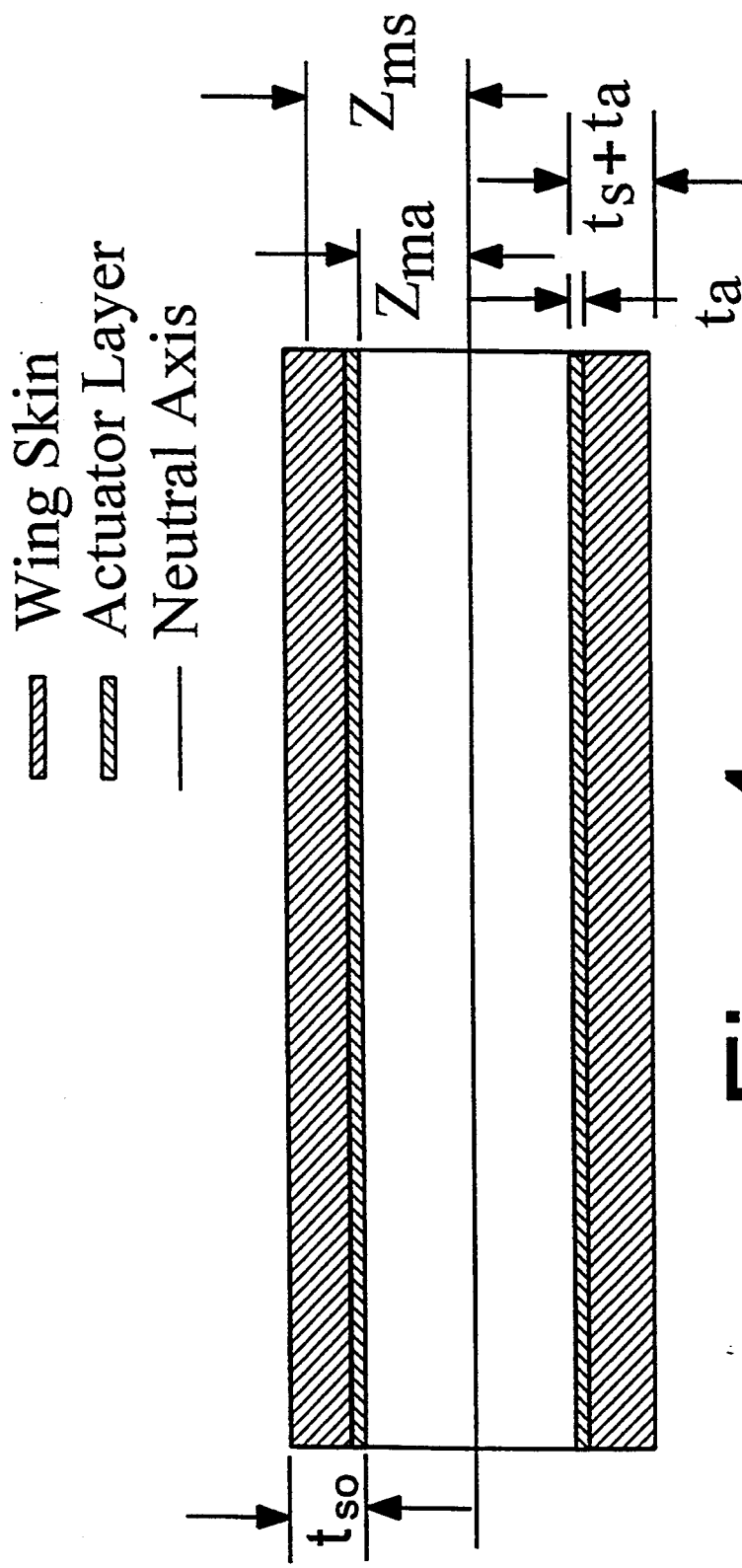
FIG. 4 illustrates actuator placement in one optimized embodiment of a box wing structure.

The deformable typical section analysis showed that an optimal configuration is achieved for practical configurations when the actuator layer distance from the neutral axis $Z_{ma}$ is large. However, the greatest height which can be achieved physically is approximately the height at which the wing skin lies above the neutral axis (the difference in performance between bonding the actuators to the interior or exterior of the wing skin, or embedding the actuators in the skin is negligible since $t_a << Z_{ma}$). These performance considerations, along with other factors such as actuator type, geometric space constraints, material compatibility, damage protection and ease of manufacturing, make bonding the actuators to the interior surface of the wing skins a reasonable actuator placement choice. Such a configuration is shown in FIG. 4. From geometry the height of the actuator layer can be easily determined $$Z_{ma} = Z_{ms} - \tfrac{1}{2}(t_a + t_s) \tag{14}$$

Additionally, it may be desirable to have the total (skin plus actuator layer) skin thickness of the wing with actuators equivalent to the original skin thickness $t_{so}$.

$$t_s + t_a = t_{so} \tag{15}$$

Thus, the actuator layer would just replace a portion of the original wing skin. This geometry was chosen for the trade studies in order to keep the wing stiffness with the induced strain actuators close to the original wing stiffness, and to reduce the weight added by the actuators.

In the configuration described, all the design variables have been fixed except the thickness of the actuator layer. Therefore, in order to achieve optimal performance, the actuator layer thickness $t_a$ is chosen which optimizes the given actuator layer height $Z_{ma}$. This optimal thickness is calculated by substituting the geometric constraints (Eqs. 14 and 15) into the optimal height equations (Eqs 6 and 10) and solving for the actuator layer thickness $t_a$.

$$t_a(\text{camber}) = \frac{t_{so}}{\left[\left(\dfrac{Z_{ma}}{Z_{ms}}\right)^2 \dfrac{(E_L)_a}{(E_L)_a} + 1\right]} \tag{16}$$

$$t_a(\text{twist}) \simeq \frac{t_{so}}{\left[\left(\dfrac{Z_{ma}}{Z_{ms}}\right)^2 \dfrac{(E_L)_a}{(E_L)_s} \left[\dfrac{1 + \dfrac{(E_L)_s(G_{LT})_a}{(E_L)_a(G_{LT})_s}}{1 - \psi_D^2}\right] + 1\right]} \tag{17}$$

Equations 16 and 17 show that the actuator layer thickness will always be less than the original wing skin thickness, which means that practical designs are possible using this configuration. By substituting the material and geometric properties of a typical win, actual optimal actuator layer thicknesses can be calculated. These thicknesses were found in the trade studies of Part II to be roughly 25% to 50% of the original skin thickness.

Added Actuator Layer Weight

The weight penalty associated with using induced strain actuators can be assessed in terms of percent weight added. The percent weight added is easily calculated from the original total weight and the final total weight (with the actuator layer)

$$\text{Original Total Weight} = \sum_{i=1}^{n} S_i(t_{so})_i \rho_i \tag{18}$$

$$\text{Final Total Weight} = \sum_{i=1}^{n} S_i[(t_s)_i \rho_i + (t_a)_i \rho_a] \tag{19}$$

where all the weight has been assumed to come from either the wing skin or the actuator layer. The percent weight added is found by dividing Eq. 19 by Eq. 18 and substituting the final skin thickness relation (Eq. 15).

$$\text{Added Weight (\%)} = \sum_{i=1}^{n} \left(\frac{t_a}{t_{so}}\right)_i \left(\frac{\rho_a}{\rho_s} - 1\right) 100 \tag{20}$$

The total added weight depends only on the ratio of actuator thickness to original wing skin thickness and actuator density to skin density. As the actuator thickness and density decreases, so does the added weight. And, if the density of the actuator is equal to the density of the wing skin, no weight is added.

For some designs, the amount of weight added, dictated by the actuator thickness and density, for an optimal configuration is not tolerable. When the added weight is limited by design constraints, the actuator thickness must be reduced from the optimal thickness to some acceptable thickness. Such a configuration is considered suboptimal, since neither the optimal actuator height or thickness is achieved. However, a suboptimal design is not necessarily a poor design, especially if the particular configuration meets all the performance objectives. Both optimal and suboptimal designs will be examined in the trade studies, discussed in Part II of this paper.

PART II—TRADE STUDIES

In the first part of this paper, analytical models were developed to study the use of adaptive structures for static aeroelastic control. Relations for the optimal actuator placement and thickness were developed from the impedance matching concepts using a deformable typical section analysis. These equations led directly to the equations relating the actuation strains to the induced bending and twist curvature. In addition, a method was presented for obtaining the aggregate lifting surface shape, in terms of camber and twist, from the induced curvatures in each section. The results from this work were utilized in the trade studies, which are described below.

In this part of the study, adaptive lifting surfaces were designed utilizing the deformable typical section results and analyzed for their effectiveness in controlling a representative aircraft. The overall wing shape, structural properties, and induced deformations found from the relations developed, were combined and included in a flexible aircraft structural model. The adaptive lifting surfaces were analyzed for control effectiveness, compared to conventional control surfaces, using the aeroelastic code TSO [Rogers, et al., 1982]. TSO integrates a Rayleigh-Ritz structural analysis and linear aerodynamics to conduct aeroelastic tailoring design and analysis of flexible lifting surfaces. The comparisons provided a good measure of the effectiveness of using induced strain actuation, compared to conventional articulated techniques, for static aeroelastic control.

The adaptive airfoils were designed and analyzed by dividing each of the nominal airfoils into several sections and designing induced strain actuators for each section. The deformations induced by the strain actuator were determined using the deformable typical section relations developed in Part I. The deformed geometry calculated was then supplied to TSO as the wing shape input. The wing shape, along with the structural and geometric properties, were used by TSO to evaluate the aeroelastic response for a variety of adaptive wing designs. Evaluating the static aeroelastic response of the structure in the two steps described provided essentially the same results as would a simultaneous aeroelastic analysis, since the wings where analyzed at operating conditions far from any static instabilities.

Figure 3A:
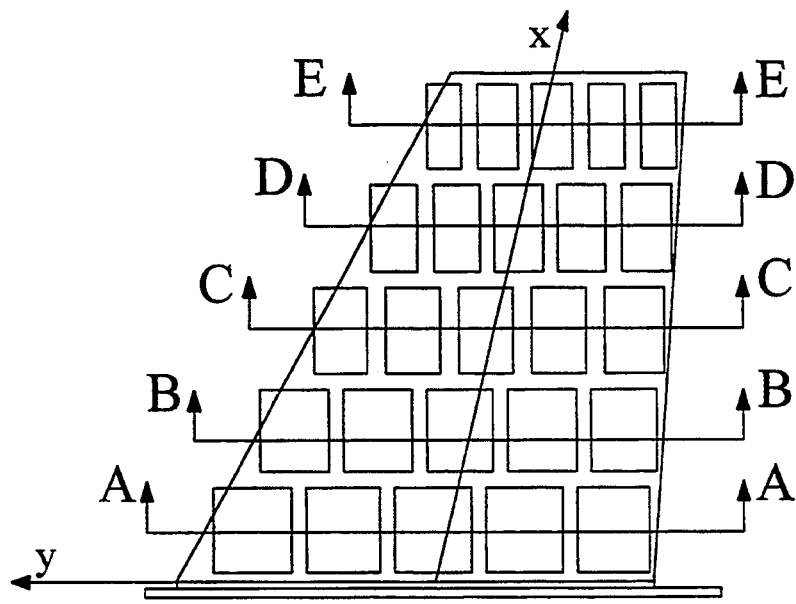
FIGS. 3A-3C show a representative wing analysis and induced shapes for camber and twist actuation.
Figure 3B:
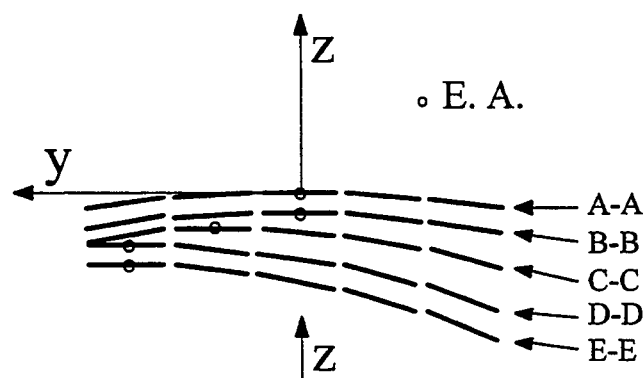
Figure 3C:

In the trade studies the strain actuator layers were chosen to be bonded to the interior surface of the wing skins, as shown in FIG. 4, due to optimal placement, protection and ease of manufacturing considerations. The lifting surface were divided into 25 sections, 5 spanwise by 5 chordwise as illustrated in FIG. 3, since both the stiffness properties and the thickness distribution of the wing skins varied significantly over each of the lifting surfaces analyzed. The properties of each section were averaged so that optimal and suboptimal designs could be found using the deformable typical section relations developed. The induced camber and twist were then calculated for each section. The total aggregate lifting surface shape and the angle of attack of each section were calculated in the same manner as described int he strain actuator design section of Part I.

The trade study utilized three different wing skin designs. Each wing had the same overall undeformed box geometry with an area of 400 square feet, an aspect ratio of 3.24, a leading-edge sweep angle of 38°, and a conventional NACA airfoil shape with a maximum thickness-to-chord ratio of approximately 4%. The three wing skins accessed were an aluminum skin, a washout (bend-up/twist-down) composite skin, and a washin (bend-up/twist-up) composite skin. All three designs were analyzed to determined the control authority developed through induced twist or camber, resulting from the symmetrically distributed induced strain actuator layers. In each case the deformations were induced by the strain actuator layers (bonded to the interior surface of the wing skins as shown in FIG. 4) which were commanded to act in opposition to produce equivalent bending moments on the lifting surface. Extension/twist designs were not studied.

Trade studies were performed for strain actuator layers composed of piezoceramics (PZT) with a maximum actuation strain of 0.1%, and shape memory alloys (SMA) with a maximum actuation strain of 1.0% and 8.0%. Four adaptive wing designs were examined for each skin subject to induced twist or camber deformations. The first design was optimal, while the second, third, and fourth were suboptimal designs with actuator layer thicknesses 75%, 50%, and 25% of the optimal thickness.

The aeroelastic analysis (TSO) provided the aerodynamic forces acting on the lifting surfaces due to induced strain actuation. These forces were calculated in the form of lift coefficients, flexible and rigid stability derivatives, and roll effectiveness data generated by the induced deformations of each design. In addition, the weight added by the actuator layers was calculated. Similar performance data was also calculated for each wing skin in a nominal configuration controlled by conventional articulated control surfaces. The trade study data was reduced in the form of the flexible lift coefficient or the roll effectiveness, versus actuator weight for each design configuration. By over plotting there performance measures versus weight for various actuators (the three induced strain actuators and the ailerons), the relative control authority provided by adaptive structures was accessed.

Such plots are shown in FIGS. 5 to 13 and are indicative of the results obtained. FIGS. 5 to 8 show the maximum lift coefficient, versus added weight, while FIGS. 9 to 13 display the greatest roll effectiveness, versus added weight for the three different induced strain actuators and the ailerons. Maximum lift and maximum roll effectiveness refer to the values associated with the maximum actuation strain of the specific actuator or the maximum aileron deflection, assumed to be 20°.

The three solid curves on each plot measure the performance of each induced strain actuator. The slop of each performance curve is dictated by the actuator/skin density ratio and the actuation strain developed by the actuator. Either decreasing the density ratio or increasing the actuation strain increases the slope of the curve and improves the performance of the particular adaptive wing. As can be seen in each graph, the shape memory alloy actuators achieved a higher level of performance, due to their relatively lower density ratio and high actuation strain compared to piezoceramics.

All of the performance curves intersect at the origin, which corresponds to a zero actuator layer thickness. As the actuator layer thickness is increased, the relative stiffness ratio $\psi$ decreases and performance is increased (the configuration moves out from the origin along the particular performance curve); however, the weight increases as well. The symbols on the graph represent the cases run. The symbol nearest the origin on each performance curve is the 25% optimal thickness case. The symbols farther from the origin represent the 50%, 75%, and 100% of optimal thickness cases, respectively. In general, only the 25% and 50% of optimal actuator layer thickness cases are plotted, since the other cases usually led to designs which were impractical in terms of weight added. Thus, because of the high density ration of the actuators used, optimal designs were usually not feasibly. However, even with suboptimal designs, considerable performance benefits were achieved for most of the adaptive wing configurations as demonstrated by the performance versus weight graphs.

An upper bound on performance is imposed by the strain limit of any adaptive structure. In some configurations, strain actuators are able to induce strain levels in the structure large enough to cause material failure. To avoid this problem the structural strain limit was chosen at 0.1% for all designs in this analysis. The maximum strain was estimated based on the maximum induced deformations found for each case considered.

An area of benefit, which shows the potential benefit in control authority obtained by using adaptive structures, is indicated in the figures. This area shows that an adaptive lifting surface can be designed which weighs the same or less than the conventional control surface (and its systems), while providing equal or greater control authority. As the area of benefit increases, so does the advantage of the adaptive wing over the conventional wing. This area of benefit indicates that induced strain actuation can lead to improved lift and roll performance for less weight than conventional control surfaces.

Discussion

The trade studies revealed that induced camber control was able to provide larger lift forces than those produced by the ailerons for several wing designs, while induced twist control provided greater roll effectiveness than both induced camber control and aileron control in nearly all configurations.

Figure 5:
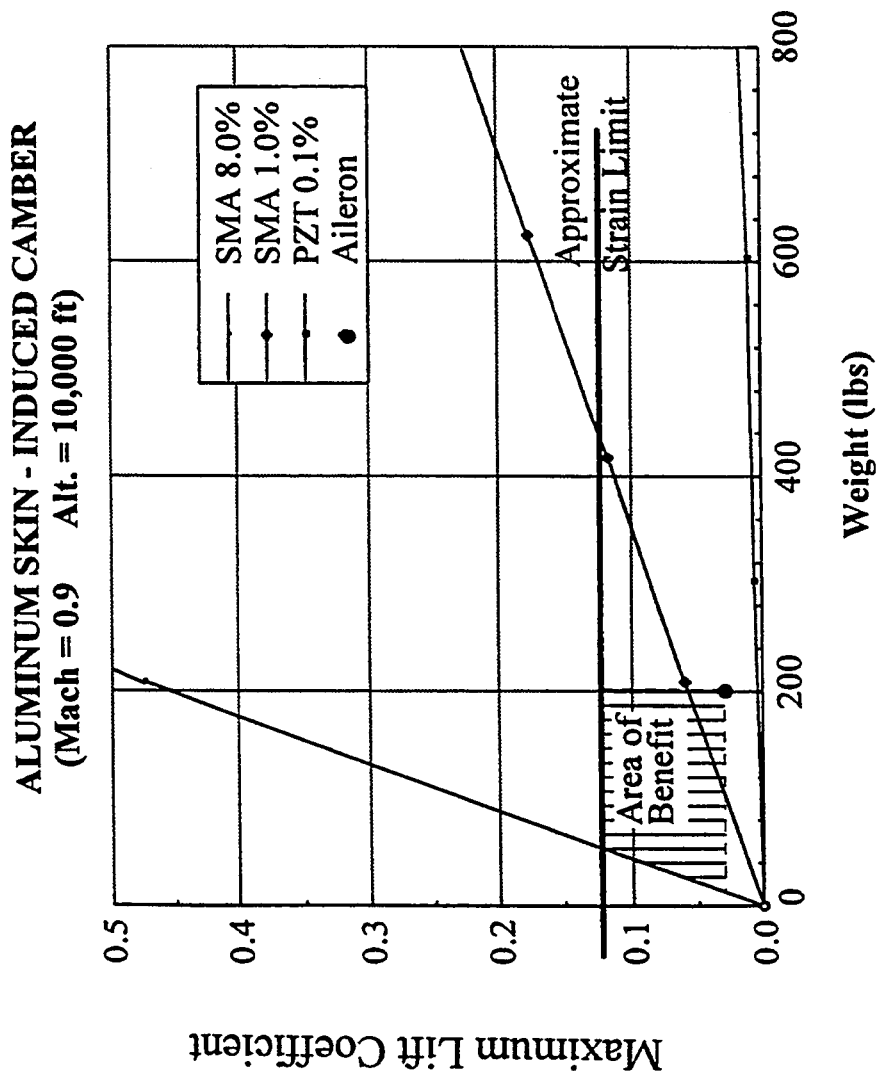
FIGS. 5-13 illustrate calculated lift and roll effectiveness of a strain-actuated wing design, evaluated against a conventional wing to determine possible improvements and associated weight penalties.
Figure 6:
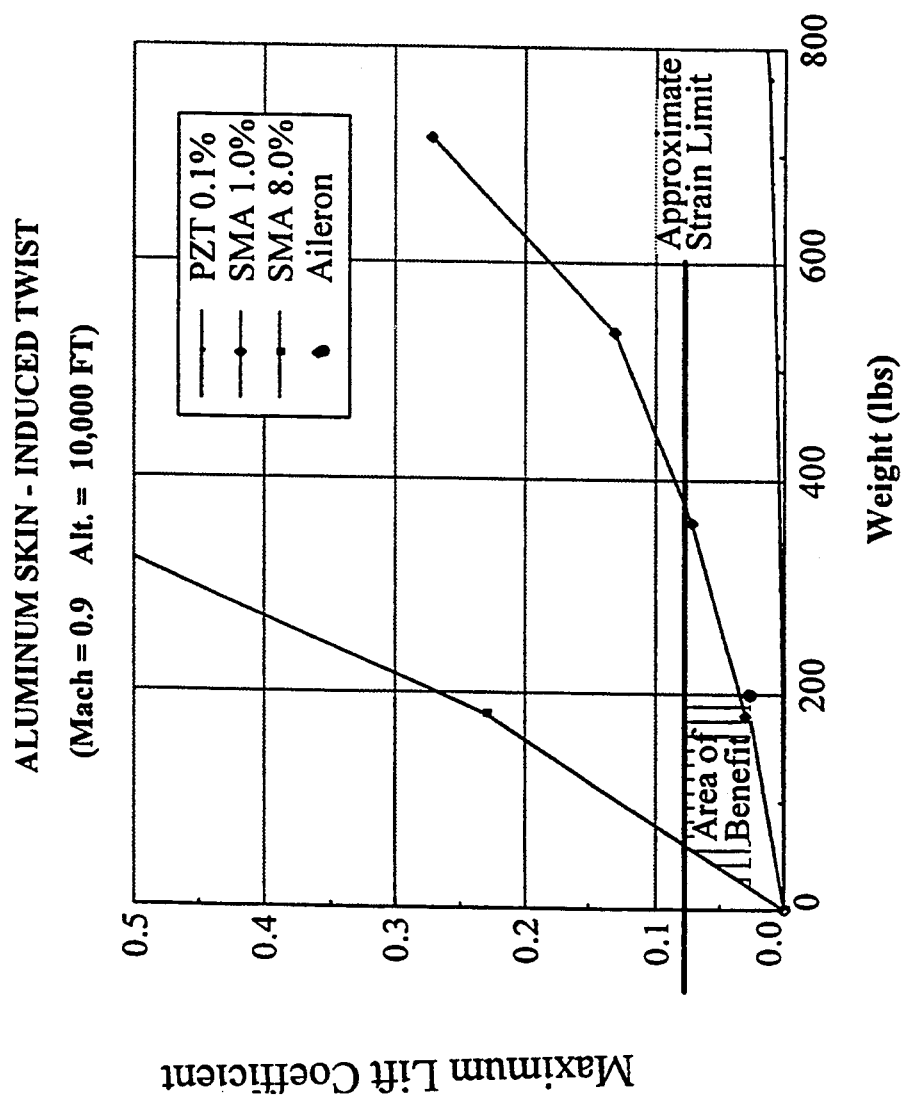
Figure 7:
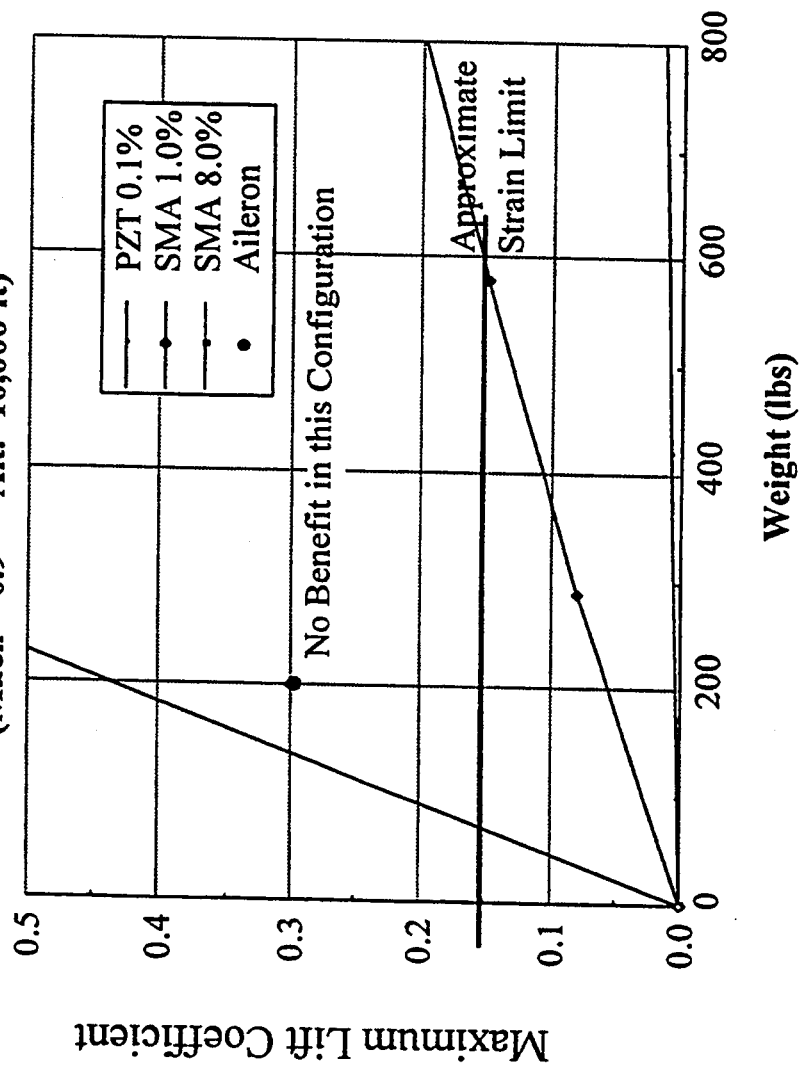
Figure 8:
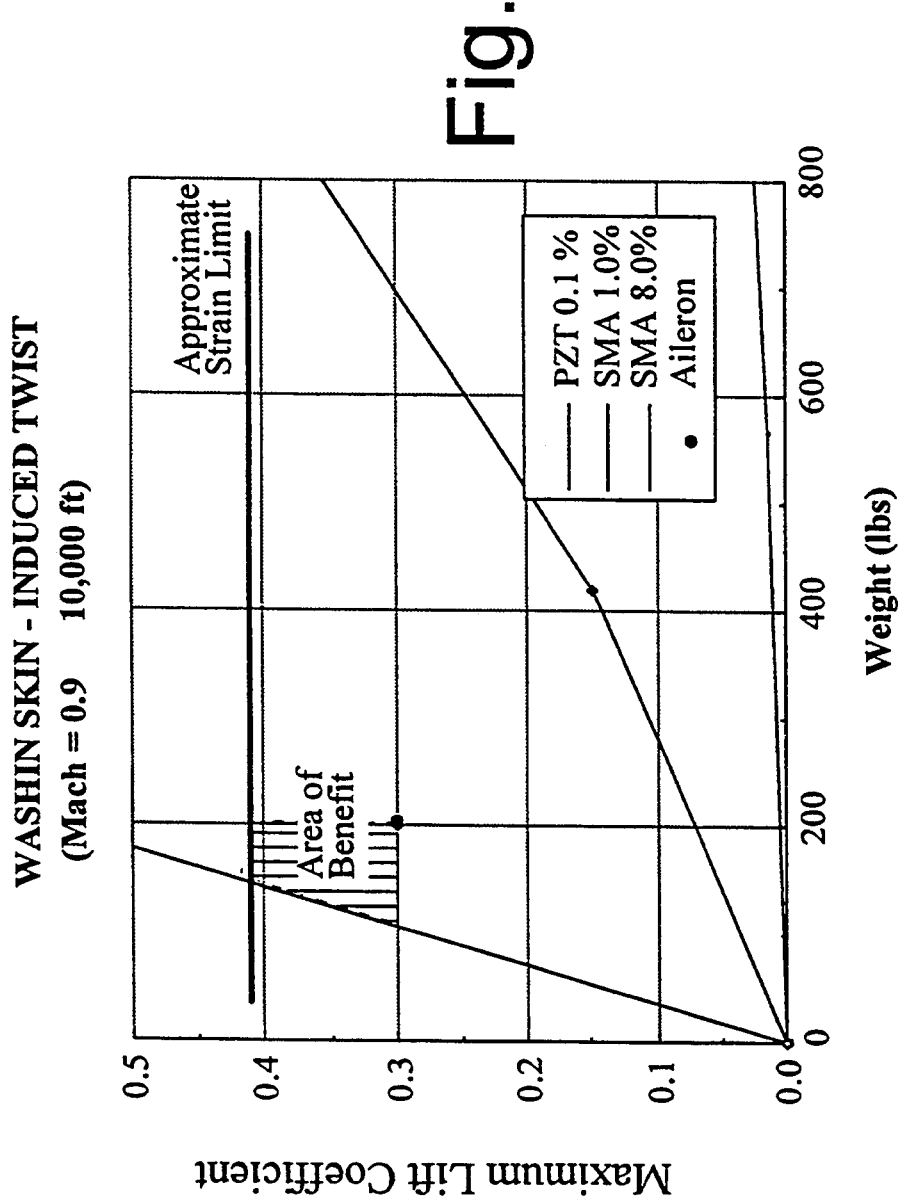
Figure 9:
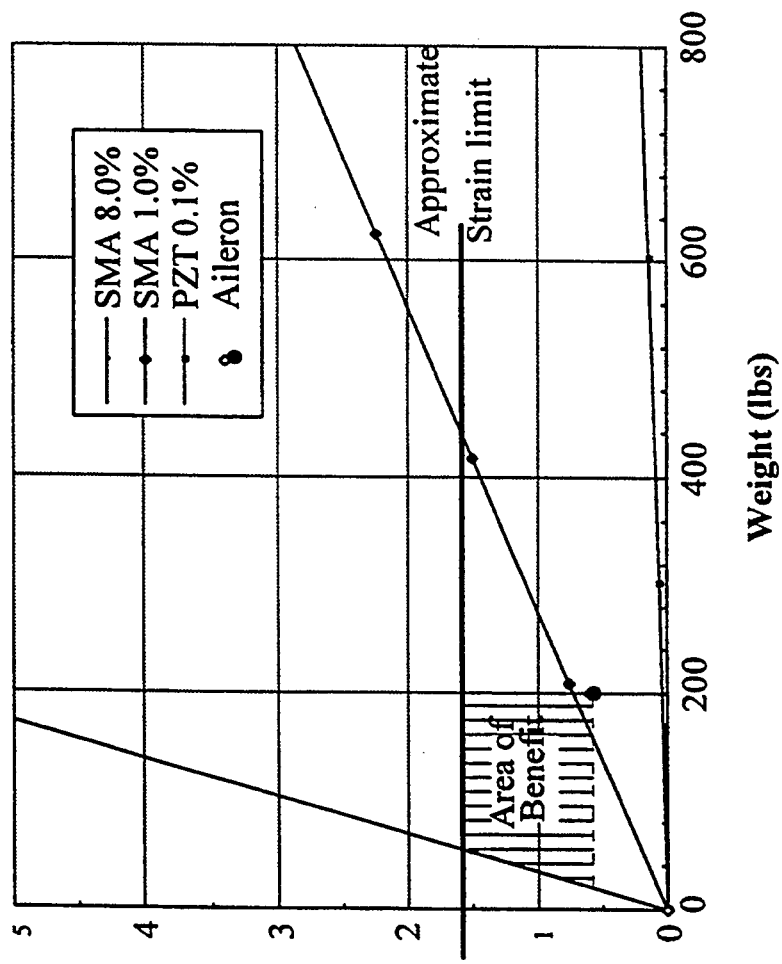
Figure 10:
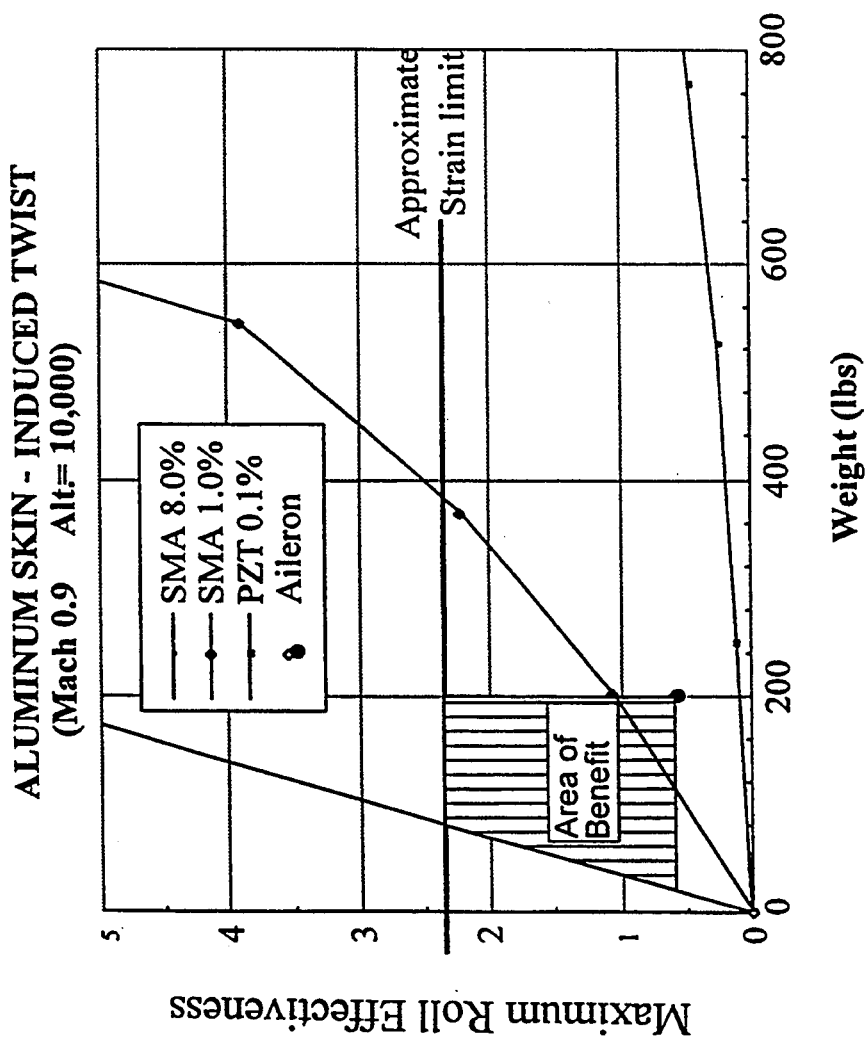
Figure 11:
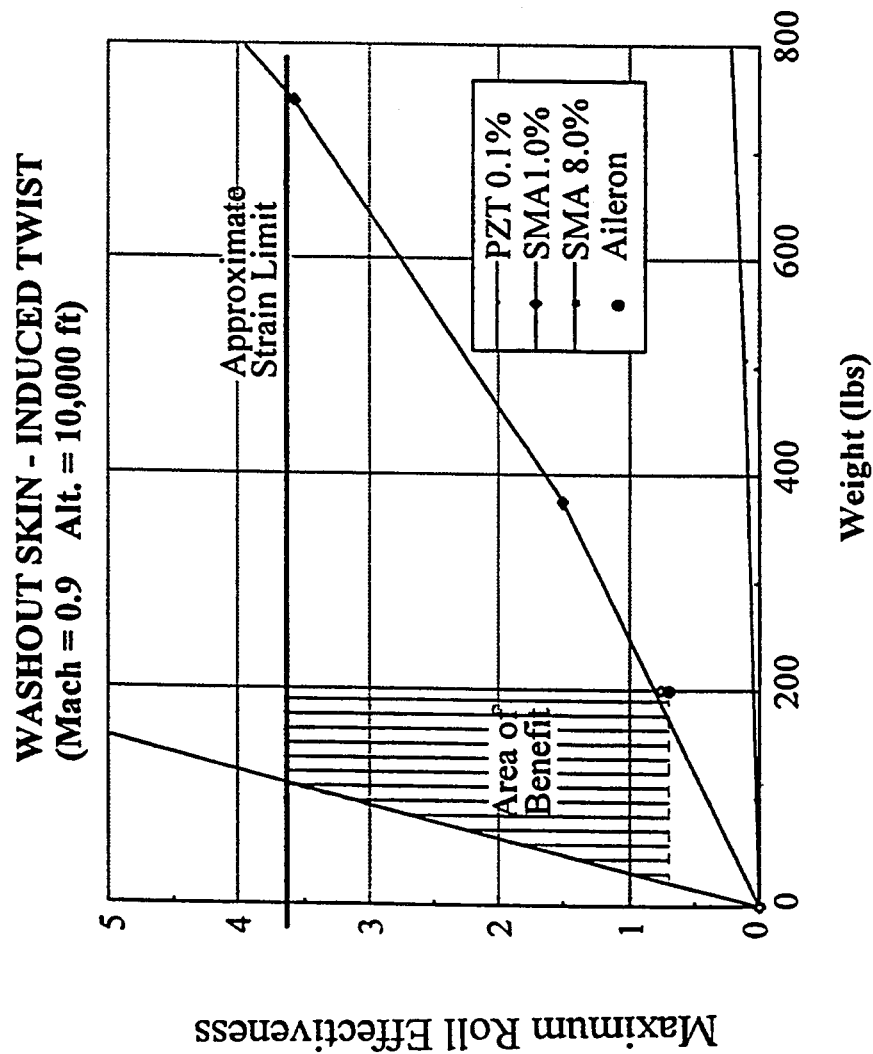
Figure 12:
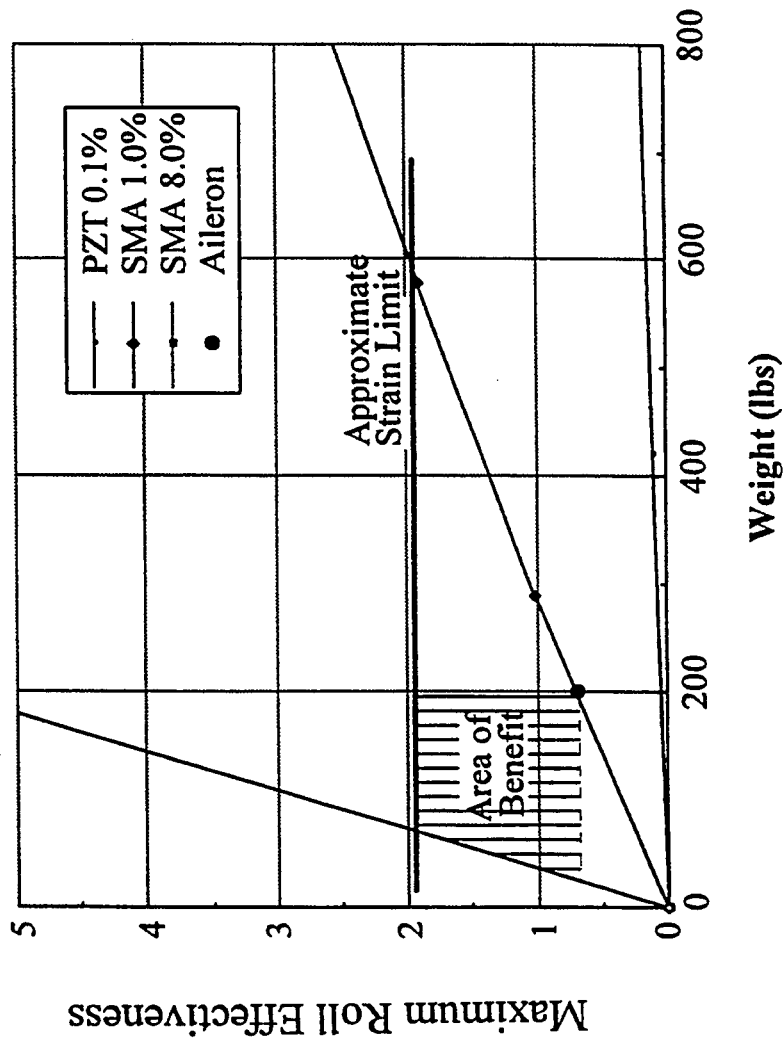

The benefits of induced camber control were primarily due to a loss of effectiveness, from aeroelastic effects, in controlling the lifting forces through the aileron. Loss of effectiveness was most apparent for the aileron controlled (nominal configuration) aluminum skin, as shown in FIGS 5 and 6. As a result control of the lifting forces was improved through induced camber and induced twist actuation for the aluminum skin. FIGS. 7 and 8 show that the aileron was more effective with the washin wing skin and provided a fairly large lift coefficient. The washin skin also gave the strain actuators additional effectiveness. But, in the induced camber case (FIG. 7) the maximum structural strain was exceeded and no benefit could be obtained. However, improved lift performance over the conventional control scheme was achieved from induced twist control with the aid of the washin skin (FIG. 8).

Induced strain actuation was found to be more effective at producing roll than in generating lift for the designs analyzed. This was because the induced deformations were greater near the tip of the wing where the structure was more flexible. The induced deformations near the tip resulted in a large amount of lift and a long moment arm, which lead to substantial rolling moments. Induced twist was found to be more effective in generating roll than induced camber (see FIG. 9 versus 10 and FIG. 12 versus 13), since the lift, which is proportional to the twist or angle of attack, is highest at the tip. A large local angle of attack is found at the tip in the case of induced twist actuation because the twist at any spanwise station is the integral of the twist curvature over the entire wing span.

Figure 13:
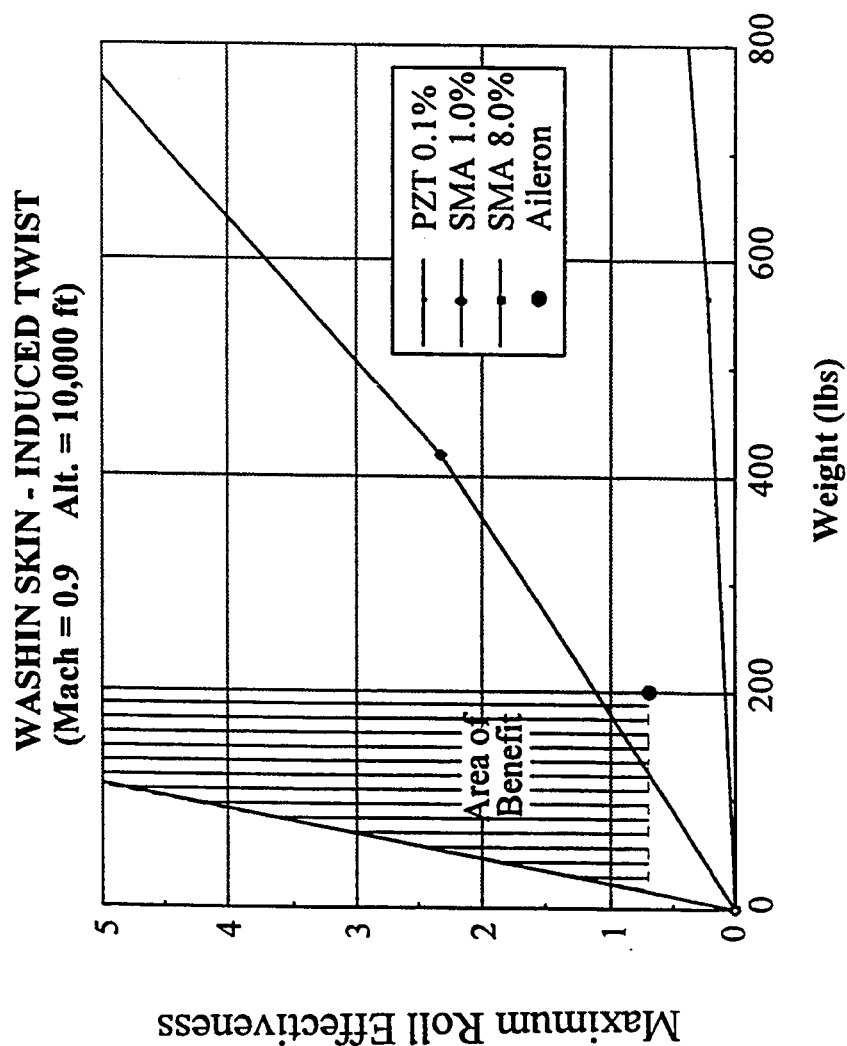

Control authority was augmented for all actuation schemes by the washin skin, but the washin wing was mos effective at increasing the roll effectiveness obtain through induced twist actuation, as shown in FIG. 13. The washin skin increased the roll moments of both the strain actuated and conventional wings, however the roll damping increased significantly in the conventional case. The washout skin (FIG. 11) also proved to be beneficial in providing roll effectiveness. Although the effects of the washout wing decreased the induced rolling moment, they also reduced roll damping; thereby having a net roll benefit in the induced twist actuation case.

In this paper, a deformable typical section was utilized to derive the optimal and suboptimal relations for induced strain actuated adaptive aeroelastic structures. The optimal relations showed that optimal adaptive airfoil designs are possible for some realistic configurations, and effective sub-optimal designs can be achieved for others. In addition, the important parameters associated with inducing curvature and twist, thereby altering the lifting forces on the wing, were determined. The most important of which were found to be the airfoil thickness ratio, the actuation strain produced by the induced strain actuators, and the relative stiffness ratio of the actuator for both camber and twist control. The stiffness coupling parameter and the wing aspect ratio were also found to be important for twist control.

The potential benefits of using adaptive airfoils for aeroelastic control, rather than conventional articulated control surfaces, is evident from the figures generated by the trade studies. As shown, greater control authority along with a lower weight penalty is achievable using adaptive aeroelastic structures for a variety of wing designs. Thus, strain actuated adaptive wings may be used rather than conventional lifting surfaces to increase performance while reducing weight, decreasing loads in critical areas, improving the radar cross section, and maximizing the lift to drag ratio at many flight conditions.

The figures also indicate that the benefits derived from strain actuation are heavily dependent on the induced strain actuator used. The most beneficial actuators are those which produce large actuation strains and are light weight. Greater control is also realized by actuators which have a high elastic modulus, which is evident upon examination of the roll of the relative stiffness parameter in the optimal lift equations, These observations explain why the shape memory alloys outperformed the piezoceramic adaptive structures in the static control analysis performed.

The reader should be cautioned, however, that there are many issues which have not yet been addressed. The most important of which is the bandwidth of these actuators. In fact, the extremely high band width (greater than 10,000 Hz) of piezoceramics compared with the very low (less than 1 Hz) bandwidth of shape memory alloys, indicates that the former is a more desirable actuator. Consequently, in choosing an actuator as part of an adaptive aeroelastic control scheme the aerospace engineer is faced with the usual stroke (actuation strain), versus weight, versus bandwidth trade-offs. Thus, the best adaptive lifting surface designs may include some combination of the above mentioned actuators, or perhaps some new materials which posses the properties needed to achieve some set of performance objectives.

The foregoing study confirmed the utility of distributed actuators for effecting some forms of control of a wing or sheet. The next step in developing a practical embodiment of the invention involves combining the mechanics of the sheet-actuator system with relevant aerodynamic effects, and determining the necessary control laws for driving selected ones of the actuators to achieve the desired operation of the sheet structure. Beyond the design of a system having sensors for detecting the parameters and plant states necessary for control, and building of a series of simple control laws for the major operating regions of the plant, this involves a number of routine tuning tasks, such as the practical work of normalizing sensor outputs and drive voltages, compensating for lags or damping of input-/output elements. A controller then is developed to operate on the state variables in each of the operating regions. Such modeling and design will now be discussed from an aeroelastic control point of view, wherein the symbols and terms of art defined in FIG. 14 are employed in the various formulae and discussions to follow.

TYPICAL SECTION GOVERNING EQUATIONS

Figure 15:
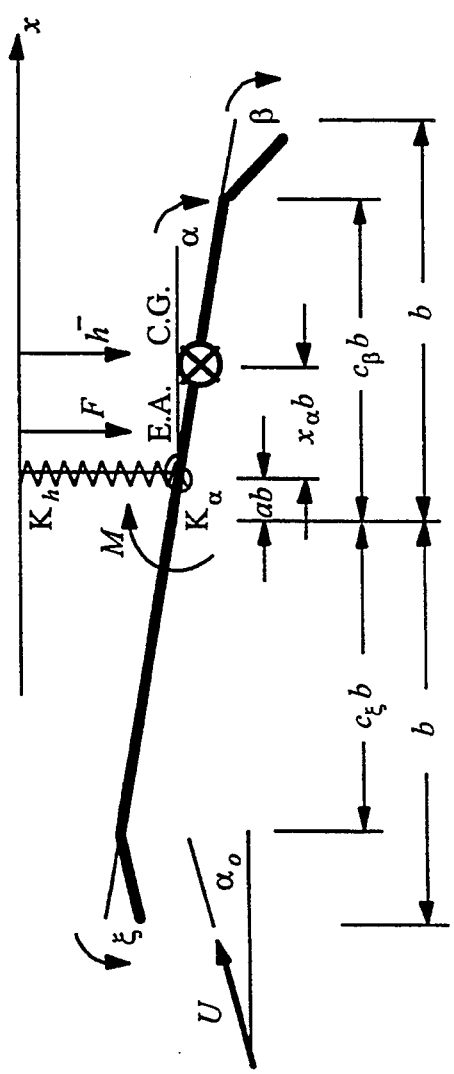
FIG. 15 is a schematic section geometry, indicating force, moment and strain parameters.

For many years low order models called typical sections have been used to explain the fundamental mechanics of aeroelasticity [Bisplinghoff, Ashley, and Halfman, 1955]. These sections capture the essential physical features, and have properties representative of actual lifting surfaces. The geometry of the typical section employed in this analysis is shown in FIG. 15. The section is given pitch and plunge degrees of freedom, and a leading and trailing edge flap. The structural restraint in bending and torsion appear at the elastic axis, and the disturbance to the section is a time variation in the inflow angle $\alpha$.

The aerodynamics are found by adapting the incompressible wing-aileron-tab lifting surface results obtained by Theodorsen and Garrick [1942] to a leading edge flap-wing-trailing edge flap lifting surface via a coordinate transformation. Only the steady state aerodynamic terms are retained to simplify the initial examination of the problem. In practice this would limit direct applicability of results to low reduced frequencies. The aerodynamic forces and moments created by deflecting the leading edge or trailing edge flap are modelled as forces and moments acting at the elastic axis, so that the high frequency dynamics associated with the flaps can be neglected. The typical section also includes forces and moments acting at the elastic axis which result from commands to the strain actuators. These are the equivalent forces and moments acting on the typical section which develop as a result of induced strain actuation. The equivalent forces and moments are found by applying Bernoulli-Euler beam and Kirchhoff plate theory as done in Crawley and de Luis [1987] or Crawley and Lazarus [1989].

Writing the equations in terms of non-dimensional mass M, stiffness K, forcing f and disturbance d matrices in the Laplace domain yields.

$$M \begin{Bmatrix} h_p{}^2 \\ \alpha p^2 \end{Bmatrix} + K \begin{Bmatrix} h \\ \alpha \end{Bmatrix} = f \begin{Bmatrix} u_h \\ u_\alpha \\ u_\beta \\ u_\xi \end{Bmatrix} + d\alpha_o(p) \quad (21)$$

or $$\begin{bmatrix} \frac{1}{R_o{}^3} & \frac{x_o}{R_o{}^3} \\ \frac{x_o}{R_o{}^3} & 1 \end{bmatrix} \begin{Bmatrix} hp^3 \\ \alpha p^3 \end{Bmatrix} + \begin{bmatrix} \frac{\omega_h{}^3}{R_o{}^3} & qC_{L_o} \\ 0 & 1 - qC_{mo} \end{bmatrix} \begin{Bmatrix} h \\ \alpha \end{Bmatrix} =$$

$$\begin{bmatrix} 1 & 0 & -qC_{Lo} & -qC_{L1} \\ 0 & 1 & qC_{mo} & qC_{m1} \end{bmatrix} \begin{Bmatrix} u_h \\ u_\alpha \\ u_\beta \\ u_\xi \end{Bmatrix} + \begin{bmatrix} -qC_{Lo} \\ qC_{mo} \end{bmatrix} \alpha$$

where $q = \dfrac{U_a{}^2}{x\mu R_a{}^2}$ Normalized Dynamic Pressure $p = \dfrac{\lambda}{\omega_a}$ Normalized Laplace Variable $u_h = \dfrac{Fb}{K_\alpha}$ Normalized Strain Actuated Plunge Force $u_\alpha = \dfrac{M}{K_\alpha}$ Normalized Strain Actuated Pitch Torque $u_\beta = \beta$ Trailing Edge Flap Deflection $u_\xi = \xi$ Leading Edge Flap Deflection and the remaining non-dimensional variables are those usually employed in a typical section analysis [Bisplinghoff, Ashley, and Halfman, 1955]. Note that the equivalent force $u_h$ and moment $u_\alpha$ produced by the induced strain actuators are normalized by the section torsional stiffness.

The characteristic equation for this two degree-of-freedom system is found by setting the right hand side of Eq 21 equal to zero $$\Delta(p) = \left[1 - \frac{x_a{}^2}{R_a{}^2}\right]p^4 + [(\omega_h{}^2 + 1) - q(C_{Lo}x_a + C_{mo})]p^2 + [\omega_h{}^2(1 - qC_{mo})] \quad (22)$$

Equation 22 shows that the roots of the system (i.e., the poles of the transfer function) are dependent on the section geometry, structural properties, and air speed, but are independent of the method of actuation. Note that there is no structural or air damping modeled in the system.

The transfer functions from the four control inputs (bending strain actuation $u_h$, torsion strain actuation $u_\alpha$, trailing edge flap defection $u_\beta$, and leading edge flap defection $u_\xi$) to the two output variables (plunge h and pitch $\alpha$) are given by $$\begin{Bmatrix} h \\ \alpha \end{Bmatrix} = \frac{R_o{}^2}{\Delta(p)} \begin{bmatrix} n(p)_{hh} & n(p)_{h\alpha} & n(p)_{h\beta} & n(p)_{h\xi} \\ n(p)_{\alpha h} & n(p)_{\alpha\alpha} & n(p)_{\alpha\beta} & n(p)_{\alpha\xi} \end{bmatrix} \begin{Bmatrix} u_h \\ u_\alpha \\ u_\beta \\ u_\xi \end{Bmatrix} \quad (23)$$

$n(p)_{hh} = p^2 + 1 - qC_{mo}$ $n(p)_{\alpha h} = -\dfrac{x_\alpha p^2}{R_a{}^2}$ $n(p)_{h\alpha} = -\dfrac{x_\alpha p^2}{R_a{}^2} - qC_{Lo}$ $n(p)_{\alpha\alpha} = \dfrac{p^2}{R_a{}^2} + \dfrac{\omega_h{}^2}{R_a{}^2}$ $n(p)_{h\beta} = qC_{Lp}\left(qC_{Mo}\left(1 - \dfrac{C_{Lo}C_{Mp}}{C_{Mo}C_{Lp}}\right) - 1 - p^2\left(1 + \dfrac{C_{Mp}x_\alpha}{C_{Lp}R_a{}^2}\right)\right)$ $n(p)_{\alpha\beta} = \dfrac{1}{R_a{}^2} qC_{Mp}\left(p^2\left(1 + \dfrac{C_{Lp}x_\alpha}{C_{Mp}}\right) + \omega_h{}^2\right)$ $n(p)_{h\xi} = qC_{L\xi}\left(qC_{Mo}\left(1 - \dfrac{C_{Lo}C_{M\xi}}{C_{Mo}C_{L\xi}}\right) - 1 - p^2\left(1 + \dfrac{C_{M\xi}x_\alpha}{C_{L\xi}R_a{}^2}\right)\right)$ $n(p)_{\alpha\xi} = \dfrac{1}{R_a{}^2} qC_{M\xi}\left(p^2\left(1 + \dfrac{C_{L\xi}x_\alpha}{C_{M\xi}}\right) + \omega_h{}^2\right)$ where each element n(p) of this two by four matrix relation represents the transfer function from one of the inputs to one of the outputs. The zeros of each individual SISO transfer function are found by setting each numerator n(p) to zero. Notice that the zero locations are dependent on the section geometry and structural properties, as were the system poles. For the case of plunge h measurement feedback the individual SISO transfer function zeros move rapidly with air speed. For the case of pitch measurement $\alpha$ feedback the zeros are not dependent on air speed.

Alternatively, the governing equations (Eq 21) can be written in a state space representation $$\dot{x} = Ax + Bu + L\alpha_o(p) \quad (24)$$
$$y = Cx$$

where $$A = \begin{bmatrix} 0_{(2\times 2)} & I_{(2\times 2)} \\ -M^{-1}K & 0_{(2\times 2)} \end{bmatrix}$$

$$B = \begin{bmatrix} 0_{(2\times 4)} \\ M^{-1}f \end{bmatrix} = [b_h b_\alpha b_\beta b_\xi]$$

$$L = \begin{bmatrix} 0_{(2\times 4)} \\ M^{-1}d \end{bmatrix}$$

$$x = \begin{Bmatrix} h \\ \alpha \\ \dot{h} \\ \dot{\alpha} \end{Bmatrix}$$

$$u = \begin{Bmatrix} u_h \\ u_\alpha \\ u_\beta \\ u_\xi \end{Bmatrix}$$

In this form, the input/output relation from the actuators to the measurements is $$y = C\Phi Bu \text{ where } \Phi = (pI - A)^{-1} \quad (25)$$

Note that the characteristic equation (Eq 22) is found by taking the determinant of $\Phi$, and that Eqs 23 and 25 are identical when the output matrix C is chosen such that the measurements y are h and $\alpha$.

TYPICAL SECTION PROPERTIES

As seen from Eqs. 22 and 23, the location of the system poles and transfer function zeros are highly dependent on the geometrical and structural properties of the typical section. It is therefore necessary to choose some nominal parameters in order to proceed with the analysis and control system design. The section properties chosen were those at the three quarter span of the Aluminum induced strain actuation test article described in Lazarus and Crawley [1989]. The test article had a full span aspect ratio of 3.9 and a thickness to chord ratio of about 1 percent. The typical section is altered to include ten percent leading and trailing edge flaps, and the elastic axis is moved forward of the midchord by ten percent of the chord so that flutter occurs before static divergence. The resulting typical section has a frequency ratio $\omega_h$ of one fifth and a mass ration $\mu$ of twenty, not untypical of built up wings. Other relevant section properties are listed in FIG. 15A.

Figure 16:
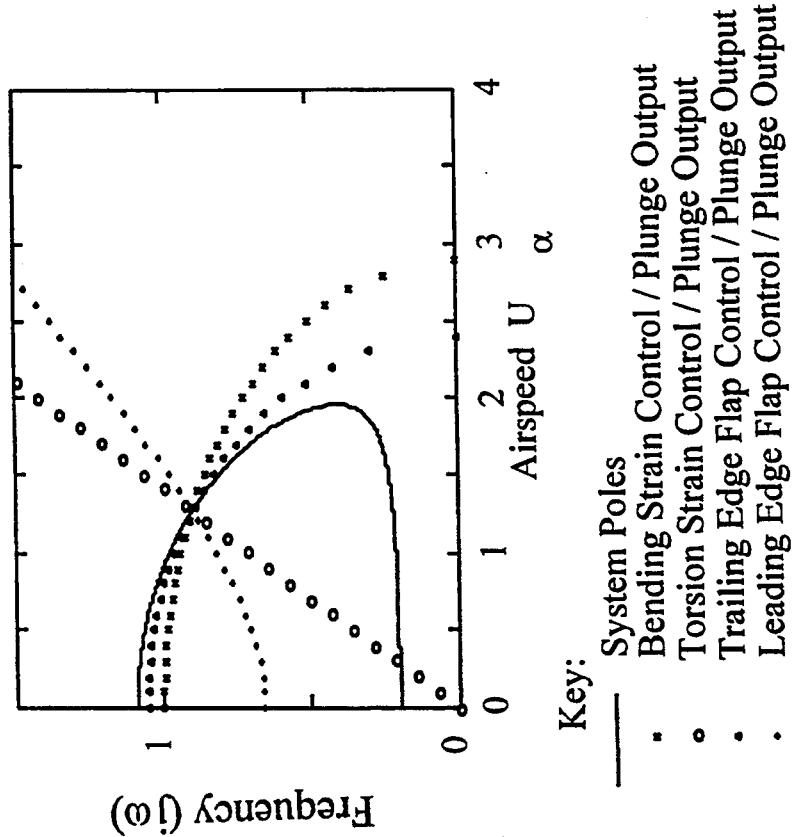
FIGS. 16-19 are graphs of zeros and/or poles of system transfer functions versus air speed Ux and single input single output control.

Knowledge of the system pole and zero locations is important for determining the manner by which a system can be controlled and is essential in designing SISO feedback control laws. In aeroelastic systems all of the pole and some of the zero locations are a function of air speed $U_\alpha$, which indicates that a control law which is appropriate at one flight condition may not necessarily be appropriate at others. In particular the rate of zero movement and the propensity for the pole/zero pattern along the imaginary axis to change (i.e., pole/zero flipping) is a particular indicator of the potential nonrobustness of the closed loop control scheme [Fleming and Crawley, 1991]. It is therefore interesting to observe the relative and absolute movement of the system poles and the SISO transfer function zeros as a function of air speed. Such a plot of the purely oscillatory poles and zeros associated with plunge measurement feedback is shown in FIG. 16. Notice the two poles coalesce at the flutter point ($U_\alpha = 1.90$).

For the case of plunge h measurement feedback, all four of the individual SISO transfer function zeros change with wind speed. The SISO transfer function zeros associated with the bending strain actuator $u_h$ are at the torsional natural frequency $\omega_\alpha$ when the air speed is zero and decrease quadratically to zero at the divergence speed ($U_\alpha = 2.88$). Likewise the zeros associated with the trailing edge flap actuator $u_\beta$ decrease quadratically with wind speed to zero at the reversal speed ($U_\alpha = 2.40$). The air speed at which the frequency component of the individual SISO transfer function zeros goes to zero is especially significant to the aeroelastic control problem since it is at this air speed that one of the zeros becomes non-minimum phase (i.e., moves into the right half of the Laplace-plane). The presence of a non-minimum phase zero indicates a fundamental limitation on the amount of control which can be applied to the system [Freudenberg and Looze, 1985]. The zeros associated with the torsion strain actuator $u_\alpha$ and leading edge flap actuator $u_\xi$ also move with air speed. The zeros in both of these SISO transfer functions increase with air speed as shown in FIG. 16.

The individual SISO transfer function zeros associated wit pitch $\alpha$ measurement feedback, which are independent of the air speed, are not shown in FIG. 16. Examining Eq 23, it can be seen that the two zeros associated with the bending strain actuator $u_h$ are always at the origin, and that the two zeros associated with the torsion strain actuator $u_\alpha$ are always on the imaginary axis at $\omega_h$. In both cases this places the zeros below the lower (plunge) pole of the system for all non-zero airspeeds. The zeros associated with the leading edge flap $u_\xi$ and trailing edge flap $u_\beta$ actuators depend on $\omega_h$ and the aerodynamic influence coefficients, and may be imaginary or real. In the event they are real, once again one would be a non-minimum phase zero indicating a limitation on achievable control.

Figure 17:
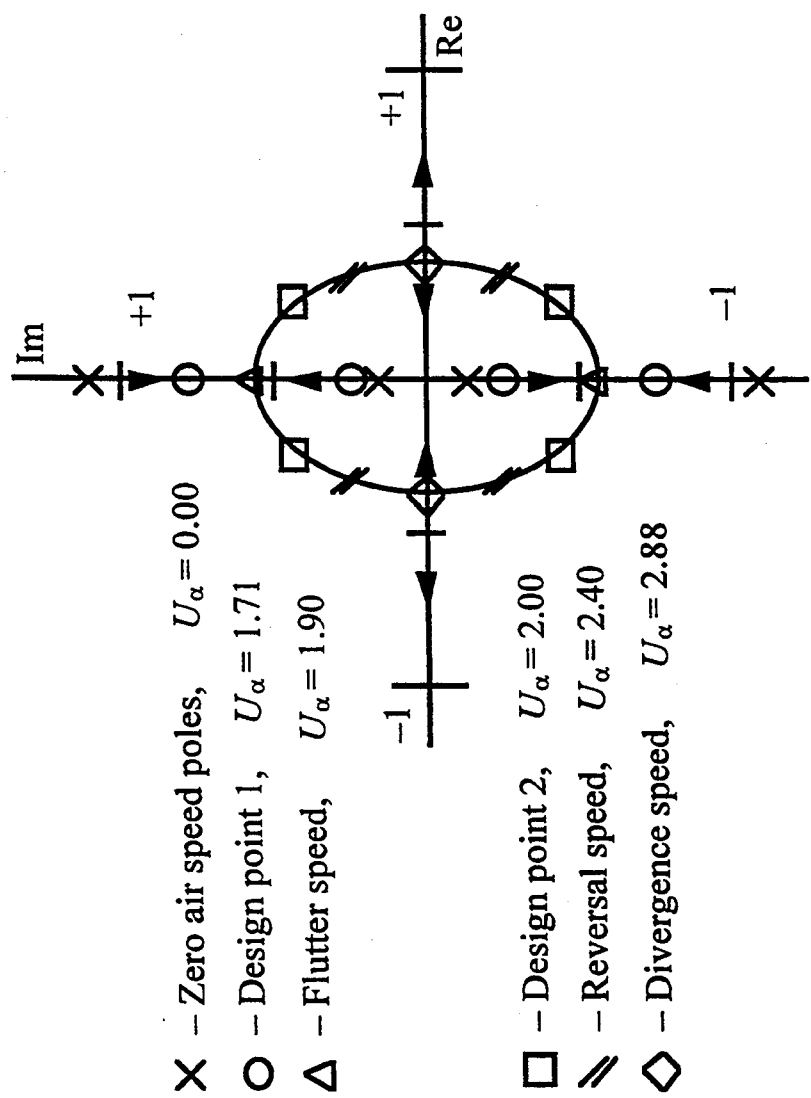

Due to the significant movement of the system poles and zeros as a function of air speed, it is necessary to choose specific dynamic pressures to analyze the system and design feedback control schemes. Two air speeds are chosen and are indicated on the pole locus plot in FIG. 17. The first speed is at about 10 percent below the flutter velocity ($U_\alpha = 1.90$) and is designated as design point 1 ($U_\alpha = 1.71$). The second is chosen at about 5 percent above the flutter velocity and is designated as design point 2 ($U_\alpha = 2.00$). Both design points are below reversal and divergence. These speeds were chosen so that the control law design would be dominated by the fundamental issues of providing aeroelastic control, and not be complicated by factors such as aileron reversal or static instabilities.

SINGLE INPUT-SINGLE OUTPUT CONTROL

Figure 18:
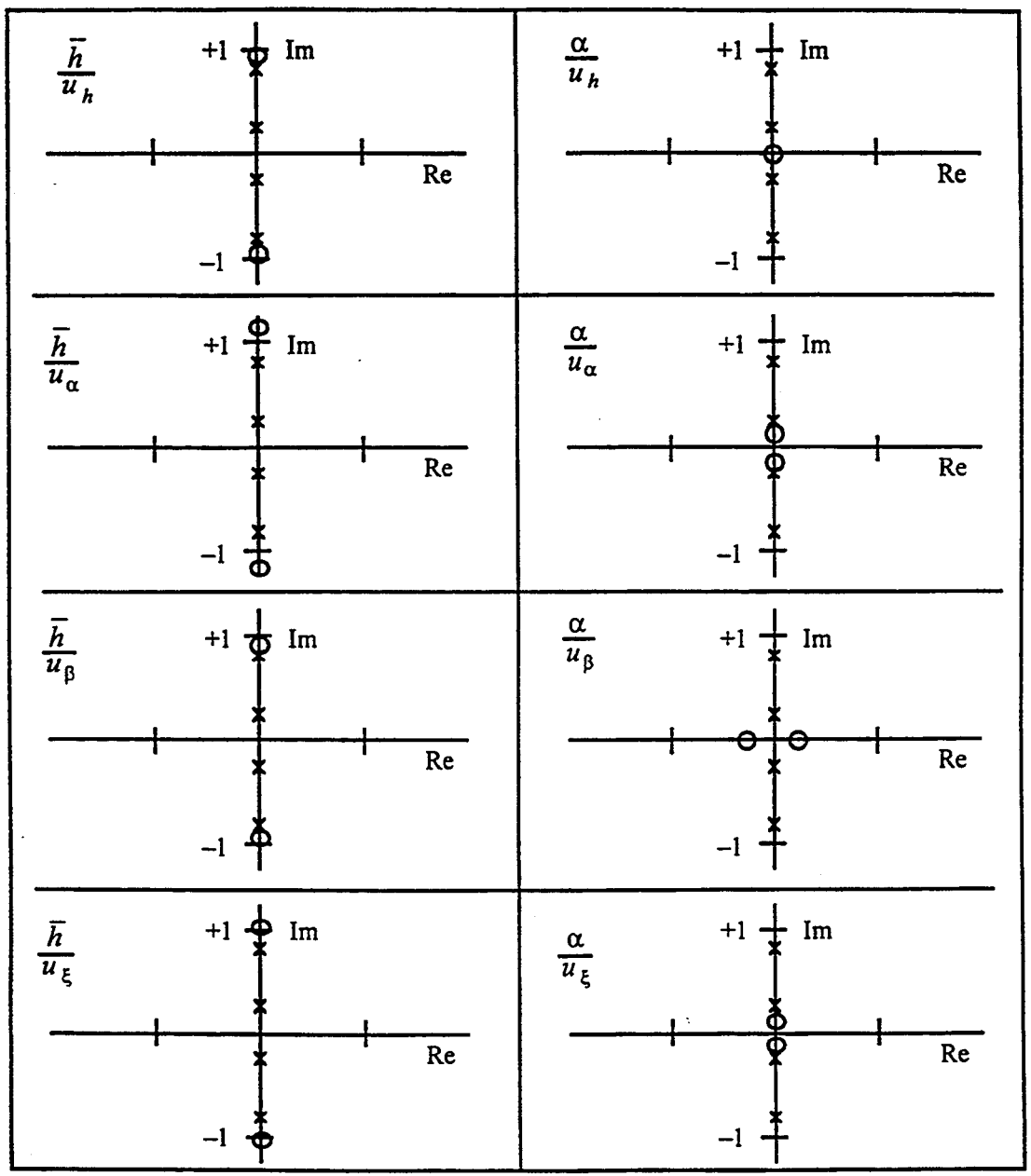

The combination of four actuator control inputs and two measurement output variables allows for eight SISO feedback control options to be considered. The transfer functions for the eight options are defined by Eq. 23, and the location of the poles and zeros are illustrated graphically in FIG. 18 for the below flutter design point ($U_\alpha=1.71$). At this wind speed all the poles lie on the imaginary axis indicating that each system is neutrally stable. Thus, the control objective is to add damping to the modes of the system [Miller, 1990]. Note that in each system there is a zero "missing" from between the two poles (i.e., between the two system poles there is no zero). This missing zero dictates that simple gain feedback, either displacement $u = -gz$ or rate $u = -pgz$, will not stabilize the system (i.e., add damping) for any value (or sign) of the gain g.

For the cases of pitch feedback to bending strain actuation $\alpha/u_h$, pitch feedback to torsion strain actuation $\alpha/u_\alpha$, and pitch feedback to leading edge flap actuation $\alpha/u_\xi$ the pitch mode can be stiffened (the frequency of this pole increases), but no damping is added to the closed loop system (i.e., the poles do not move into the left half of the Laplace plane). In all other cases, the closed loop system is destabilized (i.e., a system pole moves into the right half of the Laplace-plane) by displacement or rate feedback. Note also that the pitch measurement to the trailing edge flap actuator $\alpha/u_\beta$ transfer function, a common conventionally used SISO loop, has a non-minimum phase zero at this air speed.

Since simple feedback does not produce stable closed loop systems, other control schemes must be employed. The first option is to place a sensor at some desirable point on the section so that a stabilizing combination of the plunge and pitch output variables are fed back to the actuator. The sensor placement relation can be expressed as $$y = h + x_\delta \alpha \text{ or } c = [1 \; x_\delta 0 \; 0] \text{ in state space form} \quad (26)$$

Figure 19:
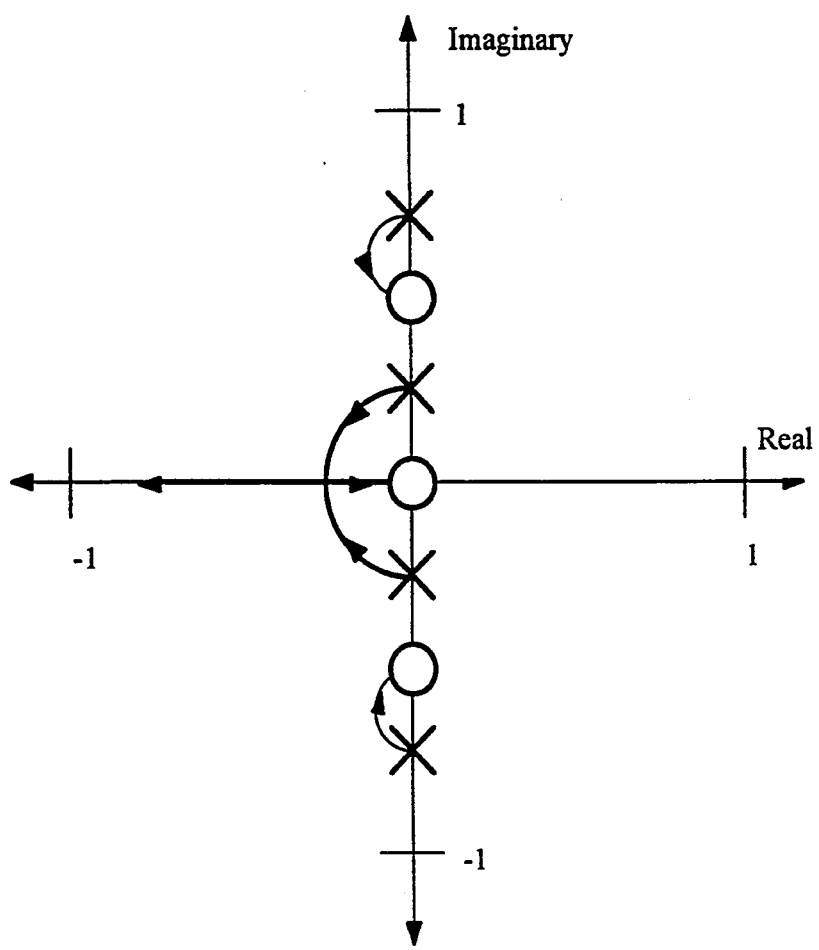

If the sensor can be placed in a position $x_\delta$ which places a SISO transfer function zero between the open loop poles, the system can be stabilized using rate feedback of the output variable y. FIG. 19 shows the poles and zeros of the loop transfer function (y/u or $c\Phi b$ in state space form) and the resulting SISO root locus for such a stabilized closed loop system. Equations 23 and 26 can be combined to give equations for the four SISO transfer functions between any of the four control inputs and the output measurement y. Setting the numerator of each transfer function zero, The sensor position $x_\delta$ can then be found, which yields the desired SISO transfer function location as a function of zero location for the four actuation schemes are $$u_h \text{ Control: } x_o = \frac{R_\alpha^2}{x_\alpha} \left( 1 - \frac{qC_{Mo} - 1}{p^2} \right) \quad (27)$$

$$u_\alpha \text{ Control: } x_o = \frac{x_\alpha p^2 + qC_{L_o}R_\alpha^2}{p^2 + \omega_h^2}$$

$u_\beta$ Control:

-continued $$x_o = \frac{p^2 \left( \frac{C_{M1}x_\alpha}{C_{L1}R_\alpha^2} + 1 \right) + 1 - qC_{M\alpha}\left( 1 - \frac{C_{M1}C_{Lo}}{C_{L1}C_{Mo}} \right)}{\frac{1}{R_\alpha^2}\left( p^2 \left( \frac{C_{Mp}}{C_{Lp}} + x_a \right) + \frac{C_{Mp}}{C_{Lp}}\omega_h^2 \right)}$$

$u_\xi$ Control:

$$x_o = \frac{p^2 \left( \frac{C_{M\xi}x_\alpha}{C_{L\xi}R_\alpha^2} + 1 \right) + 1 - qC_{Mo}\left( 1 - \frac{C_{M\xi}C_{Lo}}{C_{L\xi}C_{Mo}} \right)}{\frac{1}{R_\alpha^2}\left( p^2 \left( \frac{C_{M\xi}}{C_{L\xi}} + x_a \right) + \frac{C_{M\xi}}{C_{L\xi}}\omega_h^2 \right)}$$

By choosing $x_\delta$ such that the zero is between the poles (as i FIG. 19) a stabilizing control scheme results, in principle, for rate feedback. However, sensor placement will not work for all configurations or choices of actuators in practice. This is because the sensor location needed for stable feedback is sometimes found to be physically off of the typical section. For example, using the nominal typical section FIG. 15A and design point 1 (below flutter) values, it is possible to find a stable sensor location for each method of actuation (although this causes a near pole-zero cancellation in the trailing edge flap actuation case $y/u_\beta$). However, all of the stabilizing sensor locations are found to be physically well off of the section at design point 2. Also notice in Eq 27 that if the desired zero locations are not complex conjugate pairs the sensor position calculated will not be a real number.

The problems associated with sensor placement can be avoided by measuring both the plunge and pitch variables independently, and feeding back some linear combination of these outputs which stabilizes the system. One method of implementing such a stable control scheme is the use of full state feedback schemes such as the Linear Quadratic Regulator (LQR), which is discussed in the next section. Another SISO method of finding a stable feedback system from a single measurement to any actuator is to use a stabilizing dynamic compensator. This can be done by classical compensation design (e.g., using the methods of Bode or Nyquist) or optimal (e.g., solving the Linear Quadratic Gaussian problem) techniques.

FULL STATE FEEDBACK CONTROL

The problems associated with non-physical sensor placement solutions can be eliminated by independently measuring the state variables and feeding back a stabilizing combination of them. Using full state feedback is particularly advantageous because control laws may be developed which utilize various combinations of both the displacement and rate variables, and are not limited to combinations of variables which correspond to those which can be measured at physical locations on the airfoil.

The solution to the Linear Quadratic Regulator (LQR) problem generally provides for stable well regulated closed loop plants. Well regulated closed loop plants have the desirable properties of relatively high damping and good disturbance rejection, which satisfies the control objective of the systems under consideration (i.e., add damping). The optimal gains G for full state feedback can be found by solving the Linear Quadratic Regulator problem, which entails minimizing the scalar cost functional J $$J = \int_0^\infty (x^T Q x + \rho u^T R u) dt \tag{28}$$

where $$Q = N^T N$$

and $$z = Nx$$

In Eq 28, Q is the penalty on the states and $\rho$R is the penalty on the control inputs which equals a scale factor $\rho$ and an actuator weighting matrix R. The feedback gains are given by $u = -Gx$. The gains represent the optimal combination of the states to be fed back to each actuator. Note that the LQR solution yields a loop transfer function, given by $G\Phi B$, which will always have the stable alternating pole-zero pattern shown in FIG. 19 (although the zeros may not be on the imaginary axis). This result holds for any air speed, state cost N, or state control cost $\rho$R. However, the root locus drawn in the figure no longer applies for these multiple output and perhaps multiple input-multiple output (MIMO) control schemes.

An interesting result is found in the case of "expensive" control, which implies a large control penalty ($\rho$ goes to in infinity) and therefore small gains. An asymptotic analysis shows that the feedback gains are given by $$g = \frac{1}{\sqrt{\rho}} \sum_i \sqrt{v_i^H Q v_i} \left[ \frac{(\omega_i^H b)^H}{|\omega_i^H b|} \right] \omega_i^H \tag{29}$$

where $v_i$ and $\omega_i$ are the right and left eigenvectors of A, and the superscript H indicates the complex conjugate transpose.

For single control input systems $(\omega_i)^H b$ is a scalar so the entire quantity except for the last term $\omega_i^H$ is a scalar. Therefore, the feedback gains are determined only by a weighted sum of the left eigenvectors of the open loop system. The weights are given by the contribution of the modes (observability) to the state cost chosen. In the "expensive" control case the LQR solution produces gains which are non-zero only on the rate state variables. This result is true for any undamped single input system. The gains on the rate variables represent the optimal combination of states to use for rate feedback and thus the LQR solution is equivalent to a sophisticated rate feedback sensor placement algorithm (although the sensor does not have to be placed physically on the wing). In this low gain case the LQR solution attempts only to add damping to the system. The results show once again that damping is best added to an initially undamped structure by feeding back a stabilizing combination of the rate states. As the control becomes less expensive ($\rho$ decreases), some displacement feedback will also be added.

Although the LQR controller in general provides for stable well regulated closed loop systems, its performance has limitations. This is especially true for the single control input case. Such restrictions become most apparent in the limiting case of "cheap" control. "Cheap" control is associated with a small control penalty and high feedback gains. As the control weight $\rho$ goes to zero, the closed loop poles go to the stable finite MIMO zeros of the full Hamiltonian system if they exist [Emami-Naeini, 1984], or otherwise to infinity along stable Butterworth patterns. The MIMO zeros of the full Hamiltonian system are found by calculating the zeros of $$H(p) = [N\Phi(-p)B]^T [N\Phi(p)B] \tag{30}$$

These zeros re referred to as transmission zeros for square (number of measurements equals number of actuators) systems since they are the zeros of the MIMO loop transfer function $G\Phi B$, and "compromise" zeros for non-square systems. "Compromise" zeros do not appear in the MIMO loop transfer function.

For any system, the presence of finite stable MIMO Hamiltonian zeros implies that the poles associated with certain modes will not be able move along stable Butterworth patterns, causing a fundamental limit on the performance of the control system. This limitation is clearly illustrated in FIGS. 20, 21 which show the movement of the LQR closed loop pole locations of the nominal system as the control weight goes from a large value toward zero (from $\rho = 10^{+4}$ to $\rho = 10^{-4}$) and as a result the gains increase. In producing the pole loci of FIGS. 20, 21 the gains of the closed loop system are calculated using a state cost penalty which is a combination of the plunge and pitch displacement variables normalized by their maximum value. The maximum values FIG. 15A are determined by the deflection associated with 1% strain in the wing under consideration. The air speed is set to design point 1 (below flutter).

Figure 20:
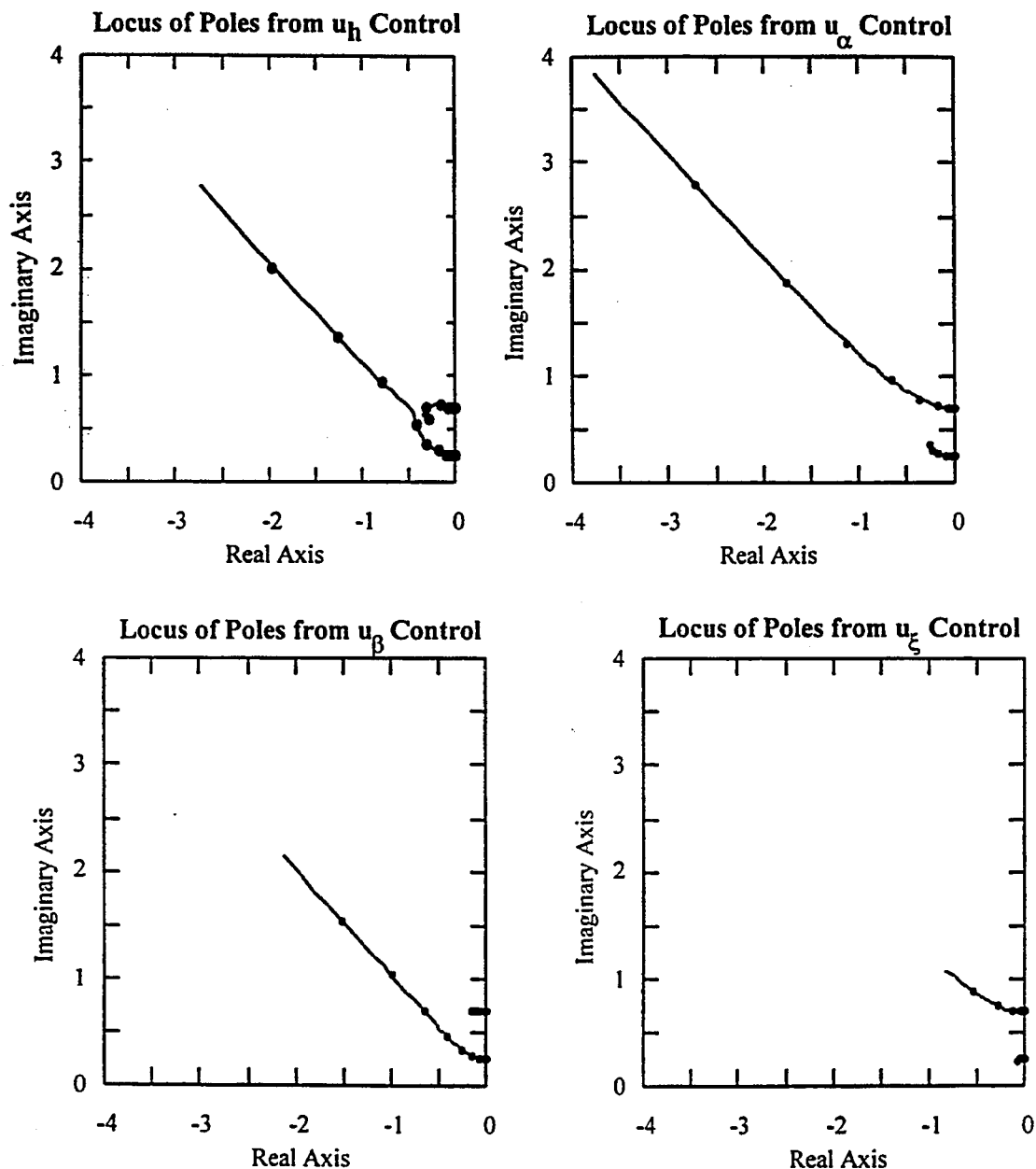
FIGS. 20, 21 show pole locations with closed loop full state feedback control.
Figure 21:
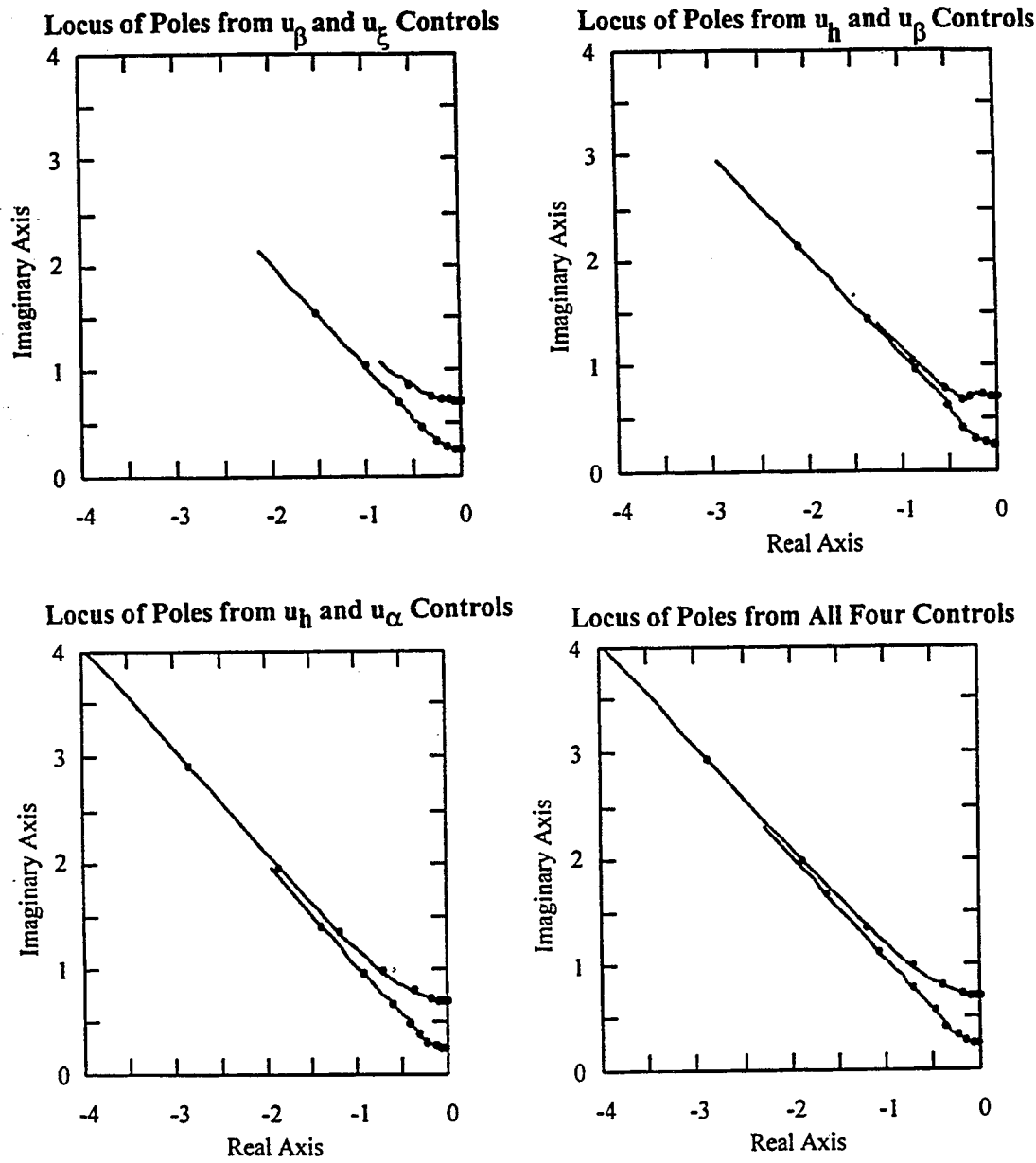

The pole locations are plotted in FIG. 20 for the cases of the four actuators acting individually. FIG. 21 shows the closed loop pole locations for the cases of the actuators acting in pairs (2 inputs) and all controls acting together. When only one of the four available actuators is used, a finite stable MIMO zero of the full Hamiltonian system is found and only one pole is able to move along a stable Butterworth pattern. Such a zero indicates that a finite amount of state cost will persist, even when a large control effort is used. This point will be illustrated by the state versus control cost curves found in the following section. Notice that for the single input cases the induced strain bending $u_h$ and trailing edge flap $u_\beta$ actuators are able to move only the plunge pole along a stable Butterworth pattern. This indicates that these two actuators primarily influence the plunge mode. The induced strain torsion $u_a$ and leading edge flap $\mu_\xi$ actuators are able to move only the pitch pole along a stable Butterworth pattern, indicating that these two actuators primarily influence the pitch mode. Also notice that the bending actuator is more effective than the trailing edge flap actuator (i.e., the poles are moved farther into the left half of the Laplace-plane), and the torsion strain actuator is significantly more effective than the leading edge flap actuator. In contrast, no transmission or "compromise" zeros are found when combinations of two or more actuators are used (FIG. 21). In these cases both poles move along stable Butterworth patterns, although for a fixed $\rho$ some combinations are clearly more effective than others.

STATE VERSUS CONTROL COST ANALYSIS

In order to qualitatively examine the effectiveness of the four actuators (bending strain actuation, torsion strain actuation, trailing edge flap deflection, and leading edge flap deflection) acting individually and in various combinations, several state versus control cost analysis are performed. The nominal section properties are taken to be those found in FIG. 15A, and the section is analyzed at design points 1 (below flutter) and 2 (above flutter). The feedback gains are found by solving the LQR problem with a state cost which equally penalizes the two normalized displacement states. These states are normalized by their maximum allowable deflection as before. Each of the controls is also normalized by its maximum value. For the strain actuators, the maximum control input is computed using a maximum actuation strain of $\Lambda = 300\mu\epsilon$, which is considered a conservative value [Pan, Zhang, Bhalla, and Cross, 1989]. The maximum deflection for the trailing edge flap is taken to be 5 degrees, and the maximum leading edge flap deflection is determined by equating its maximum hinge moment with that of the trailing edge flap, and found to be about 2.5 degrees. In order to determine a finite cost, a broadband disturbance source is introduced in the form of a one degree broadband variation of the free stream air flow.

Figure 22:
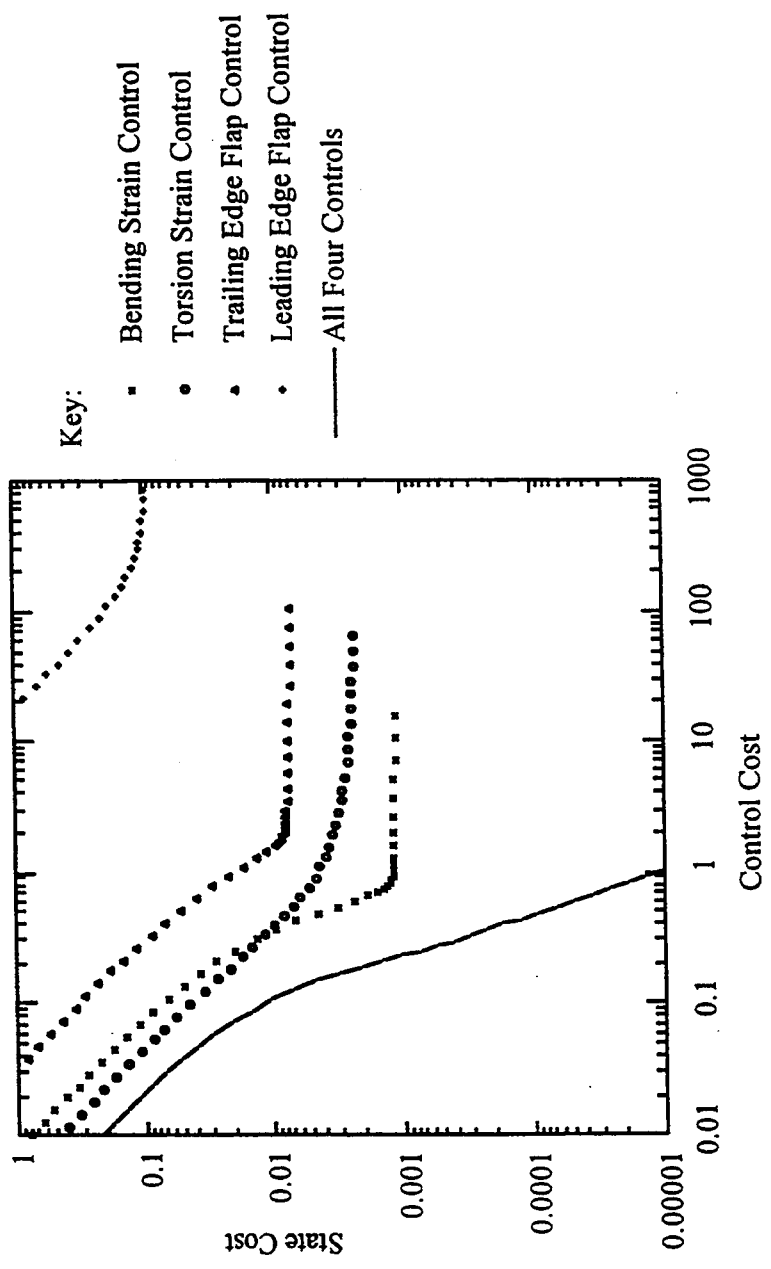
FIGS. 22-24 show state versus control cost with different actuator combinations.
Figure 23:
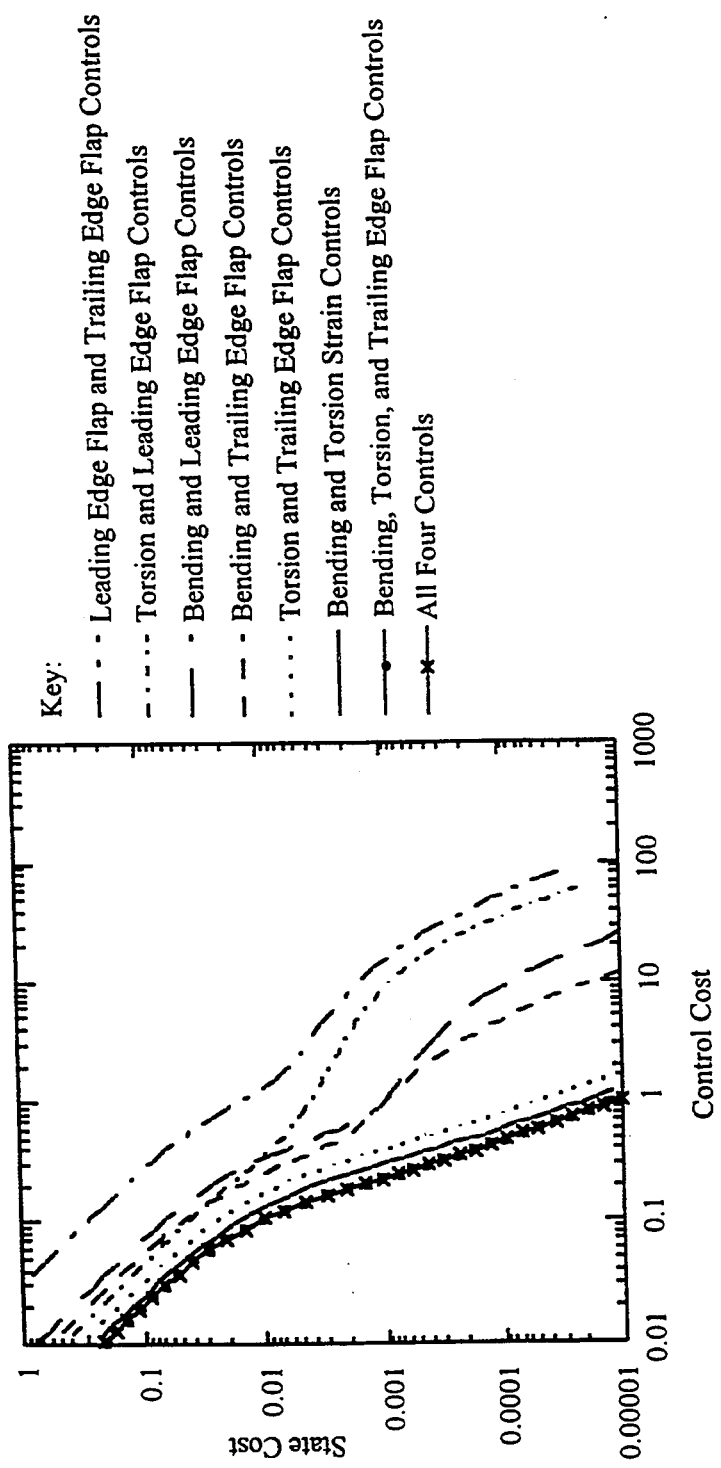

The results for design point 1 are shown in FIGS. 22 and 23 in the form of state cost versus control cost curves. Each curve represents a different actuator configuration. In FIG. 22, curves are present for each actuator acting individually and all four acting together, the condition which creates the minimum state versus control cost. In FIG. 23, the cost associated with combinations of any two actuators acting together are plotted, as well as the curve for three actuators (bending strain, torsion strain, and trailing edge flap) and of all four actuators acting together. The curves are derived by fixing all of the parameters of the problem except the control cost weighing $\rho$ which is varied from $\rho = 10^{+4}$ to $\rho = 10^{-4}$. On these curves low control cost values indicated "expensive" control weighting (high $\rho$), low gains, and therefore high state cost associated with large responses, while high control cost values indicate "cheap" control weighting (low $\rho$), high gains, and lower state cost associated with smaller responses. The lower the state cost for any given control cost, the greater the effectiveness of the actuator or combination of actuators.

As can be seen in FIG. 22 for single control inputs, the bending strain control $u_h$ is most effective in the low gain "expensive" control case while torsion strain control $u_\alpha$ is most effective for high gain "cheap" control. The cost curves show that the induced strain bending and torsion actuators are more effective than the conventional control surfaces throughout the entire range of control gains. It is also evident from the figure that the leading edge control surface is significantly less effective than the other actuators. Each curve associated with a single control input is observed to flatten out or asymptote to some finite state cost value. It is at this point that each actuator reaches its fundamental limit in terms of ability to exert control on the system. Not that the actuators have not saturated, but have imparted sufficient control to move one of the closed loop poles asymptotically near an open loop stable finite MIMO zero of the Hamiltonian system, as shown in FIG. 20. Since this closed loop pole will move no further despite larger control effort, the state versus control cost curve flattens. This is evidence of the fact that the presence of fewer control actuators than important degrees of freedom in the system leads to "compromise" zeros, and places a fundamental limitation on the degree of aeroelastic control which can be exerted.

The curves associated with control schemes which utilize more than one actuator are shown in FIG. 23 and are, in general, much more effective than the single actuator systems. This is especially true for the "cheap" control high gain cases, where the improvement is observed to be over two orders of magnitude for some configurations. No fundamental performance limits are encountered in these multiple-input control systems for which the number of actuators (two or more) at least equals the number of degrees of freedom in the system. The state costs associated with the multiple actuator systems are shown in FIG. 23 to decrease as the control effort is increased throughout the entire range of control gains. As the gains increase the system closed loop poles move outward along the stable Butterworth patterns, typified by the pairs shown in FIG. 21. The rate at which these poles move in the complex plane is directly related to the effectiveness of the multiple actuator system in question.

FIG. 23 shows that the combination of the bending and torsion strain actuators and the combination of the trailing edge flap and torsion strain actuators provide the best performance. These actuator combinations, bending and torsion strain or trailing edge flap and torsion strain, are found to be effective because they combine an actuator which effectively controls plunge (bending strain or trailing edge flap) with one which effectively controls torsion. In contrast the bending strain and trailing edge flap actuator combination is much less effective since both actuators tend to control only the bending force on the wing and have little influence on the torsional moment. FIG. 23 also shows that the combination of "conventional aerodynamic surfaces, leading edge flap and trailing edge flap, are the least effective actuator pair. In fact, all of the curves associated with the leading edge flap exhibit poor performance. The pairs which include the leading edge flap do not provide much more control performance than that given by the other actuators acting alone. The curves show that only after reaching the single actuator asymptote does the presence of the leading edge flap allow for more control to be effected. Finally, it is observed that the performance obtained using three actuators and all four actuators is only marginally better than that obtained using either the bending and torsion strain actuator combination or the trailing edge and torsion strain actuator combination. This is because there are only two modes to be controlled and these two combinations of actuators can effectively control both modes. Therefore little additional benefit is obtained when more actuators are used than modes important to the problem.

Figure 24:
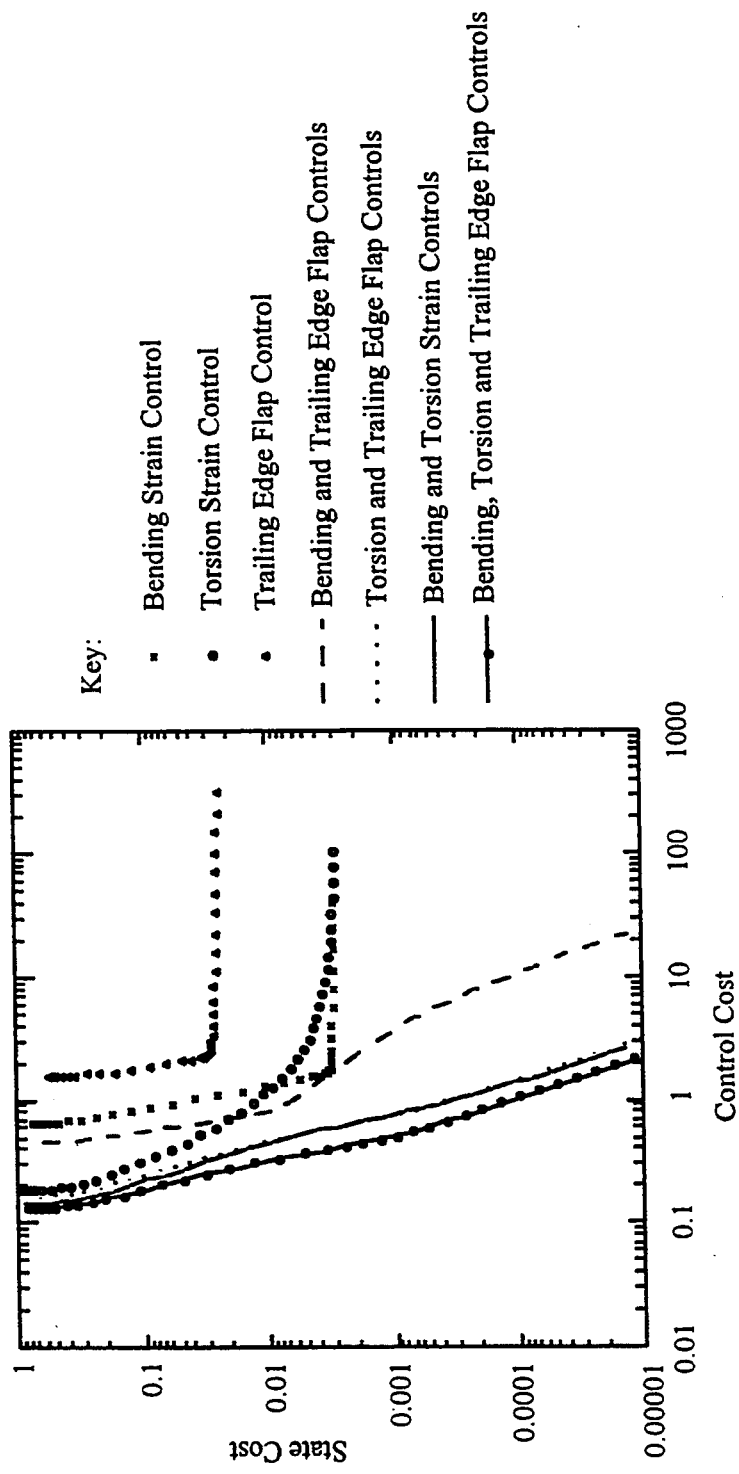

FIG. 24 shows similar results for individual actuators and several combinations of actuators at design point 2 (above flutter). The strain actuators once again are more effective than the conventional control surfaces. The bending strain actuator is the most effective while the leading edge actuator provides only very small amounts of control and is not plotted in the figure. As in the below flutter case, actuator combinations are more effective than single actuator control schemes, with the combination of bending and torsion strain actuation being most effective. Also notice the vertical low gain asymptotes in FIG. 24. Unlike the system of FIGS. 22 and 23 (below flutter) which could have finite state cost with infinitesimal gain, the system of FIG. 24 (above flutter) is initially unstable, and these low gain asymptotes are associated with the minimum amount of control required to stabilize each system.

In this study the tool necessary for understanding the fundamental mechanisms and limitations involved in aeroelastic control, and for comparing alternative control methods were developed. A typical section analysis which included the applied forces and moments produced by induced strain actuation, as well as conventional aerodynamic control surfaces, was utilized for this purpose.

Classical control techniques were employed to analyze various Single Input-Single Output (SISO) control schemes. It was found that both the poles and zeros of the individual SISO loop transfer functions move rapidly with air speed, and that the zeros are often in undesirable locations for effecting SISO control, including being non-minimum phase. It was also found that simple gain feedback of any of the state variables would not stabilize the systems considered, and that it was necessary to use some combination of the rate states in order to achieve a stable output feedback loop. Stable feedback loops were found using sensor placement techniques and the solution to the Linear Quadratic Regulator (LQR) problem. For the limiting case of low gain "expensive" control the LQR solution was found to yield a solution similar to that of sensor placement (i.e., a stabilizing combination of the rate states), but was not restricted to gain ratios which corresponded to physical sensor locations.

A state versus control cost analysis was performed using the solution to the linear quadratic regulator problem for a variety of actuator and sensor combinations. It was found that when fewer actuators are used than important modes modeled in the system fundamental control limitations are identified by the finite Multiple Input-Multiple Output (MIMO) transmission or "compromise" zeros. The closed loop poles will go to these zeros, rather than along stable Butterworth patterns in the case of high gain "cheap" control. It was found that such limitations can be avoided by utilizing at least as many control actuators as important modes in the system.

Finally, the state versus control cost comparisons demonstrated that strain actuation is an effective means of controlling aeroelastic systems and a viable alternative to conventional articulated control surfaces. Either bending or torsion strain actuation is as effective alone as trailing edge flap actuation, and much more effective than leading edge flap actuation. Only by incorporating strain actuation can an effective second actuator be added to the system, and true high gain performance achieved.

The foregoing analysis establishes the basis mechanisms involved in aeroelastic control, and allows a "cost" evaluation for comparison with alternative control methods. The modeling showed that both the poles and zeros of the individual SISO loop transfer functions move rapidly with changing air speed, and that the zeros are often in undesirable locations for effecting SISO control, including being non-minimum phase. Applicant also found that simple gain feedback of any of the state variables would not stabilize the systems considered, and that it was necessary to use some combination of the rate states in order to achieve a stable output feedback loop. Stable feedback loops were found using sensor placement techniques and the solution to the Linear Quadratic Regulator (LQR) problem. For the limiting case of low gain "expensive" control, applicant found the LQR solution to be a solution similar to that of sensor placement (i.e., a stabilizing combination of the rate states), but not restricted to gain ratios which correspond to physical sensor locations.

A state versus control cost analysis was performed using the solution to the linear quadratic regulator problem for a variety of actuator and sensor combinations. Applicant found that when fewer actuators are used than there were important modes modeled in the system, fundamental control limitations are identified by the finite Multiple Input-Multiple Output (MIMO) transmission or "compromise" zeros. The closed loop poles will go to these zeros, rather than along stable Butterworth patterns, in the case of high gain "cheap" control. It was found that such limitations can be avoided by utilizing at least as many control actuators as there are important modes in the system.

Finally, state versus control cost comparisons demonstrated that strain actuation is an effective means of controlling aeroelastic systems and is a viable alternative to using conventional articulated control surfaces. Either bending or torsion strain actuation is as effective alone as trailing edge flap actuation, and is much more effective than leading edge flap actuation. Only by incorporating strain actuation can an effective second actuator be added to the system, and true high gain performance achieved.

Figure 25:
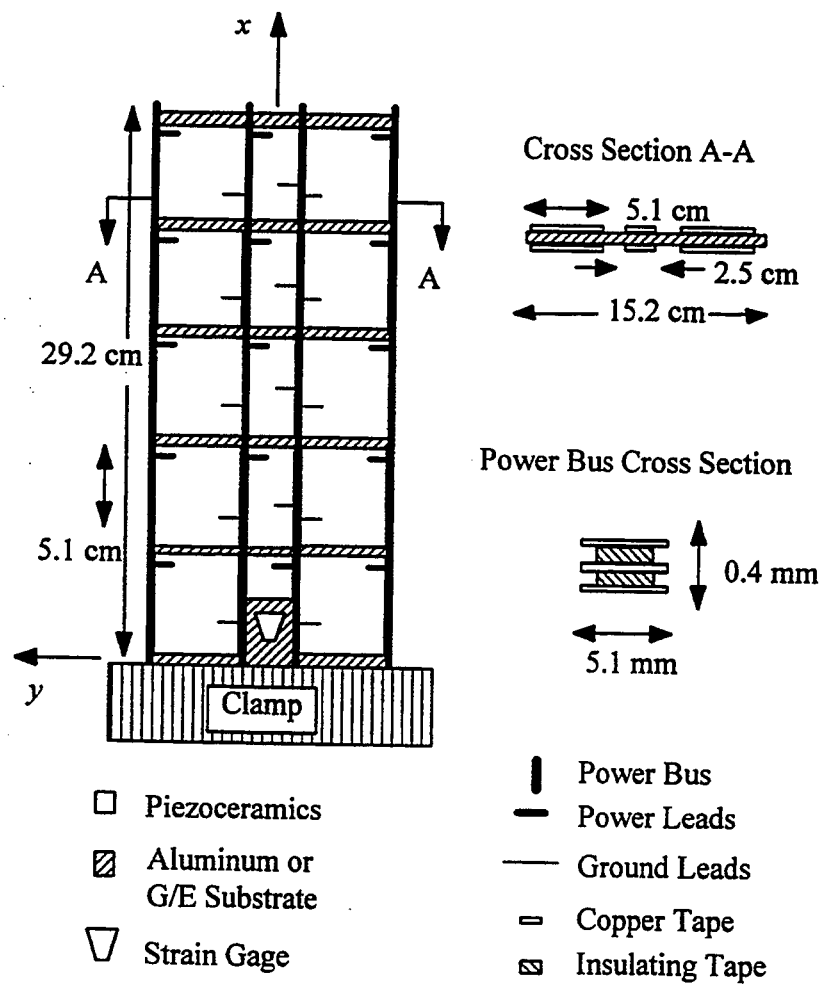
FIG. 25 illustrates a strain actuated lifting surface test article used for bench testing of a control system developed for the model of FIGS. 1-4.

The application of the foregoing results to a particular sheet structure test article will now be described, with reference to a plate structure schematically shown in FIG. 25. Such test articles were constructed previously at the Massachusetts Institute of Technology (MIT), Space Engineering Research Center (SERC) and are described in detail in Crawley and Lazarus (1989). FIG. 25 shows a diagram of the strain actuated adaptive lifting surface test articles. Three different model lifting surfaces were analyzed and tested. An aluminum article was designed and tested as a benchmark specimen, and a bending/twist coupled graphite/epoxy (G/E) and an extension/twist coupled (G/E) laminated composite specimen were designed and tested in the expectation of achieving enhanced aeroelastic control. The test articles had a span of 11.5 in. (29.2 cm) and a chord of 6 in. (15 cm), which resulted in a full span aspect ratio of 3.83. The test articles had a thickness to chord ratio of approximately 1.0%, and were fixed at the root by an immobile clamp in both the bench-top and wind tunnel test configurations. Each of the model adaptive wings had 70% of each surface covered with surface-bonded piezoceramics. The test articles were constructed such that the 30 piezoceramic wafers bonded to each wing could be selectively grouped into 1- to 12- independent control inputs.

The motion of the lifting surface test articles was measured by three non-contacting Keyence LB-70 laser displacement sensors. Each sensor had a bandwidth of 700 Hz., range of 5.5 in. (14 cm) and resolution of $7.1e^{-3}$ in. (180 microns). The displacement sensors were used to measure the motion 0.5 in. below the tip of each lifting surface. One sensor measured the motion 0.5 in. aft of the leading edge ($y_1$). Another sensor was used to measure the displacement at the mid-chord ($y_2$), and a final sensor detected the motion 0.5 in. forward of the trailing edge ($y_3$).

For the bench-top experiments a non-contacting magnetic proximity sensor was driven as an actuator and used as a disturbance source. The magnetic field created by the proximity sensor produced a disturbance force on a square steel target attached to each test specimen. This disturbance force was applied at the quarter chord in order to simulate an effective aerodynamic force. The magnetic proximity sensor was placed at approximately the quarter span because at this location the disturbance source was found to excite the test articles most effectively. A gust generator constructed to provide a 1- to 3- degree broadband angle of attack variation in the free stream flow was designed to supply the disturbance for wind tunnel experiments.

A 20 mode Rayleigh-Ritz analysis was utilized to model the strain actuated lifting surfaces. The Ritz model was able to retain the needed high fidelity while keeping the model order to a minimum.

The 20 modes incorporated in the Ritz analysis included five spanwise beam bending (B), four torsional (T), and two chordwise (C) modes. The spanwise x distributions of the torsional and chordwise modes were calculated from a Partial Ritz analysis based on work of Crawley and Dugundji (1980), and included root warping stiffness terms. In addition, segmented spanwise and chordwise modes were utilized in order to correctly model the distribution of strain energy between the piezoceremic wafers and the aluminum or G/E lifting surface substructure. Finally, static quadratic spanwise and chordwise modes were found to be essential for correctly predicting the system transmission zeros and steady state transfer function magnitudes, so these were added to the model.

The experimentally measured and analytically predicted poles of the aluminum test article are listed on Table 1, FIG. 26. The Ritz predictions are within 5% of the experimentally measured values over the control bandwidth of approximately 200 Hz.

The model was further refined by updating the system poles and inherent structural damping using experimental frequency response data. The exact frequency of each mode was measured using a Fourier Analyzer and the damping was estimated based on the half power bandwidth technique. Incorporation of the experimentally measured values onto the analytic model was facilitated by transforming the system to modal coordinates. By supplying the mode shapes, modal mass, modal stiffness, and geometry to the kernel function unsteady aerodynamic code UNSAER, the aerodynamic forces acting on the adaptive lifting surface are calculated.

Figure 27:
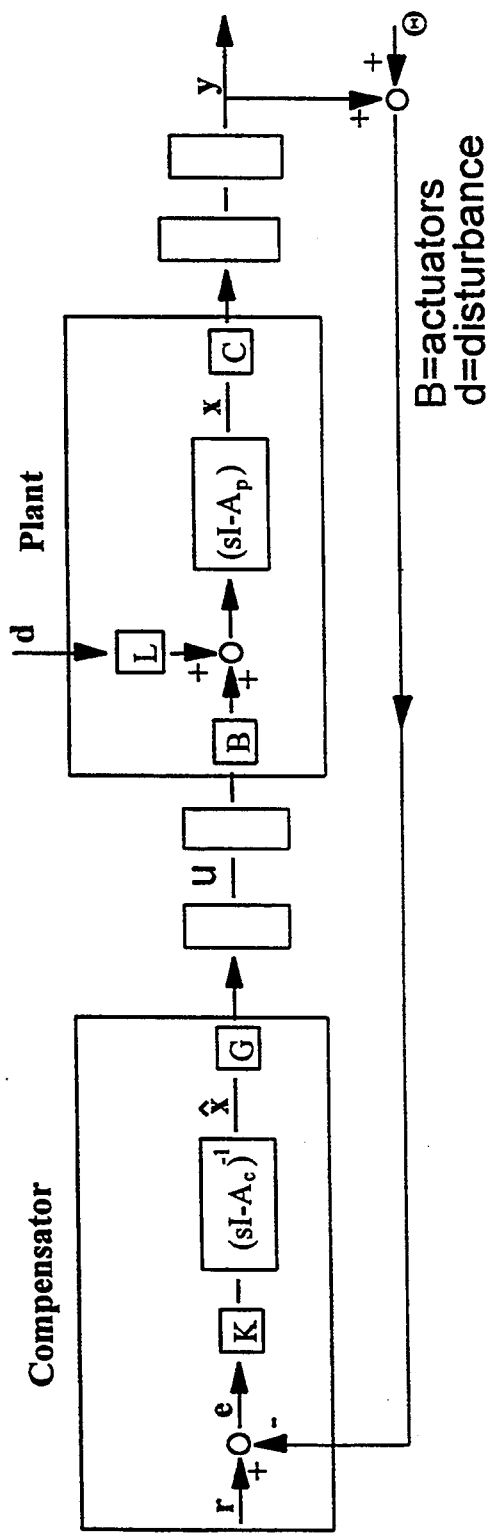
FIG. 27 is a block diagram of the control system of the present invention.

Next, a full plant model of the system to be controlled is constructed, including the sensors, actuators an any other electronics such as anti-aliasing filters. A block diagram of the system components modelled in this study is shown in FIG. 27. Incorporation of all the system components was easily facilitated by transforming the structural system into state space form.

Each fundamental mode of the structure enumerated above was represented by two states.

The state space model was then augmented with the appropriate dynamics associated with each component in the system. The full plant system was found to have 73 states. Forty of the states were associated with the twenty structural modes. The remaining states resulted from the dynamics of the sensors (1 pole at 700 Hz.) actuators (no dynamics) and anti-aliasing filters (2 poles at 1000 Hz. for each of the 3 sensor outputs and 2 poles at 2500 Hz. for each of the 12 control inputs). This large order system "truth" or "logical" model was used to evaluate all of the control laws.

The final step in generating a usable full plant model was to scale the system inputs and outputs. The inputs and outputs were scaled by their maximum values in order to increase the reliability of the model order reduction procedure, and to facilitate inputs which are measurable ($\pm 10$ volts) and outputs which are commandable ($\pm 10$ volts) by a digital control computer.

This 73 state logical model was next reduced to a lower order design model based on the Hankel singular values of the system. The Hankel singular values were found by first making the system minimal and then obtaining a balance realization using the algorithm of B. C. Moore (1981) in the PRO-MATLAB program. All states associated with the Hankel singular values greater than 0.1% of the maximum singular value were retained in the model. The steady state components of the discarded states were also retained in the model. This procedure reduced the logical model to a 22 state "design" model. It was found that the disturbance to sensor output (y/d) and control input to sensor output (y/u) transfer functions to the "design" model were nearly identical to those of the logical model. Applicant further found that increasing the order of the "design" model had no effect on the transfer functions, the controllers designed or their performance. This provided an effective model for establishing the control laws.

In designing control laws it was first necessary to define the performance objectives and metrics for the controlled system. The dynamic control performance objectives of greatest interest for aeroelastic control were flutter suppression, vibration suppression, and gust alleviation. In terms of control system design, these issues translate into those of stability, plant regulation and disturbance rejection, respectively. A well-regulated plant has the properties of guaranteed stability and good disturbance rejection, so the dynamic aeroelastic control problem reduces to designing control laws so that the plants are well-regulated.

One set of performance metrics for such a control objective can be defined in terms of quadratic cost functions which measure for RMS response of the system outputs. Using such a quadratic cost function as the performance index enables the cost function used in the known LQG design synthesis procedure to be selected in a logical manner and to meaningfully measure controller performance. For this reason, the system was evaluated using as the state cost the sum of the output y RMS response squared. Similarly the control cost was chosen to be the sum of the control u RMS response squared.

These quadratic cost functions, based on the RMS response of the outputs and inputs, completely defined the Linear Quadratic Regulator (LQR) portion of the separable LQG problem. The estimator, or Kalman filter, half of the problem was set up by defining disturbance and sensor noise covariance matrices based on laboratory measurements of the disturbance source intensity and the accuracy of the laser displacement sensors.

Controllers were designed with piezoceramic actuators grouped in various arrangements. It was found that the best controller complexity, limited primarily by the speed of the digital to analog (D/A) converters, versus actuator control authority, was achieved by dividing the piezoceramic wafers into three actuator groups. The three groups were formed by first pairing each of the piezoceramics on opposite sides of the neutral axis, thus creating individual bending actuator pairs. One actuator group was then formed from the actuator pairs nearest the leading edge of the lifting surface ($u_1$). The second group was comprised of the actuator pairs centered at the mid-chord ($u_2$). The third group was made up of the actuator pairs near the trailing edge ($u_3$). All three of the laser displacement sensors were utilized in all the control designs.

Controllers were designed for the 3-input, 3-output, 22 state "design" model for each of the lifting surface test articles. Controllers were designed for relative state to control cost weights $\rho$ ranging from $1e^{+4}$ to $1e^{-4}$ and sensor noise estimates of 1%, 3% and 6%. These LQG compensator designs were then reduced to 14th order compensators using the same procedure as was used to reduce the "truth" or "logical" model to the "design" model. Finally, the reduced order continuous time compensators were transformed to the discrete time domain via a Tustin transform. The sampling rate was chosen to the 2000 Hz., which provided adequate frequency resolution in the control bandwidth of approximately 200 Hz. This rate was found to be the practical limit of the Heurikon KH68/V30 digital control computer used to implement these 3-input, 3-output, 14 state digital compensators.

To evaluate the different controllers, the original 73 state logical model was used. All of the designs with control costs which did not lead to actuator saturation were found to be stable, with no high frequency modes destabilized. Additionally, applicant observed that increasing the order of these compensators had no effect on closed loop performance. Therefore, all experimental instabilities were attributed to model error or actuator saturation rather than to the simplifications of the model or compensator order reduction process.

Analytic and experimental results for the aluminum test article in the bench-top test configuration are briefly described below. These results were found to be typical of this series of analyses and experiments.

Figure 28:
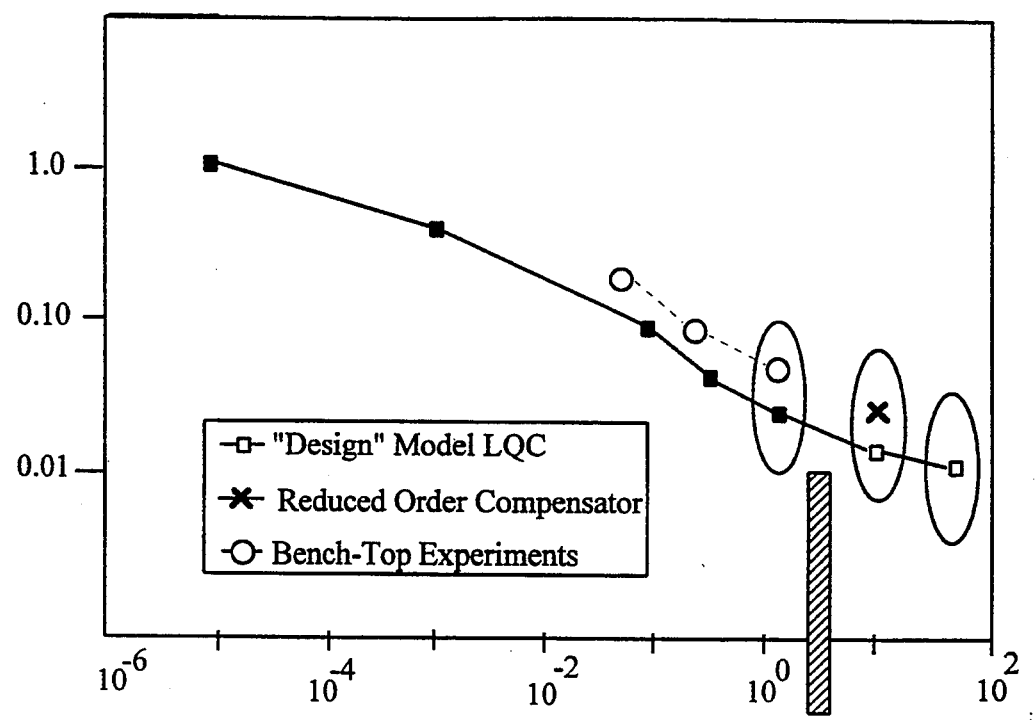
FIGS. 28 and 29 illustrate the analytical and experimental control cost and frequency response, respectively, of a test article and prototype controller.
Figure 29:
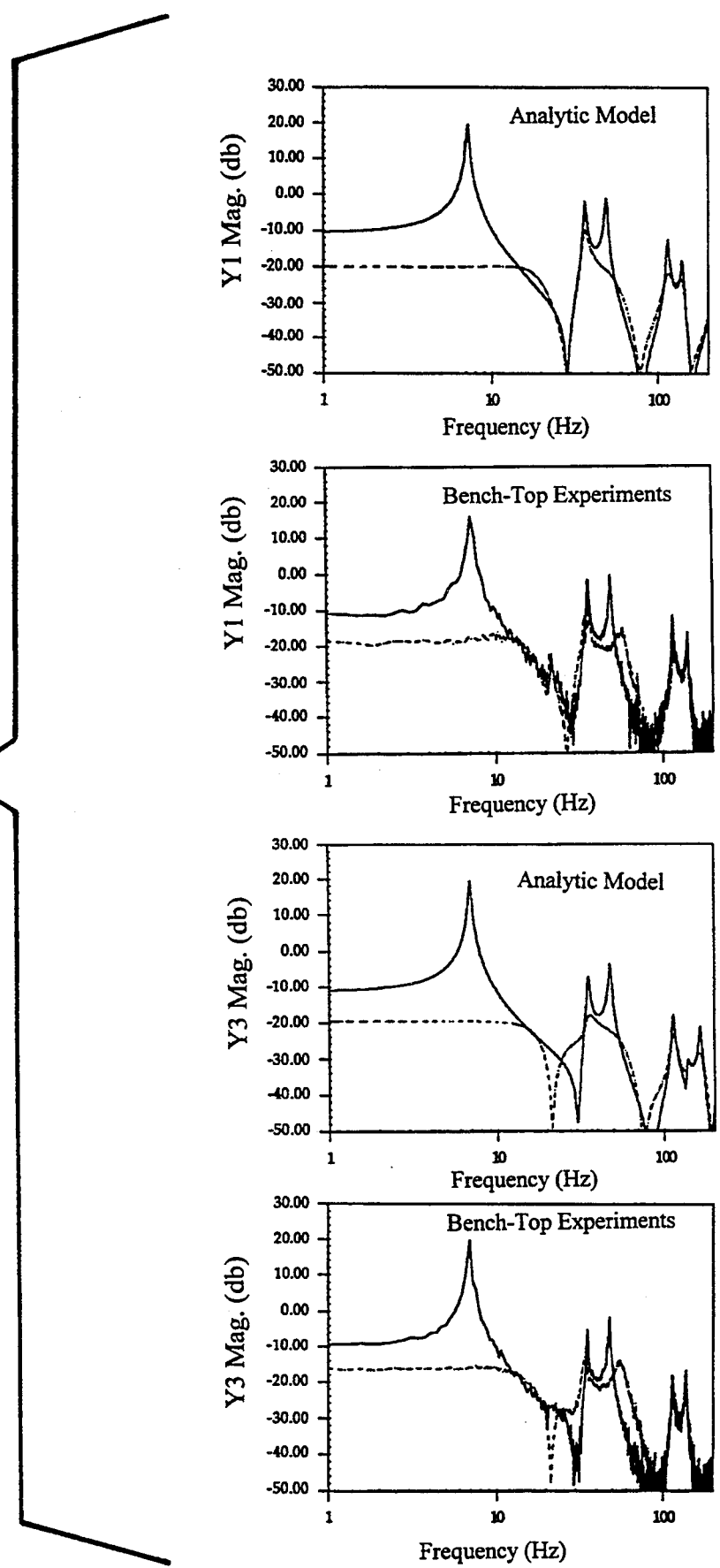
Figure 30:
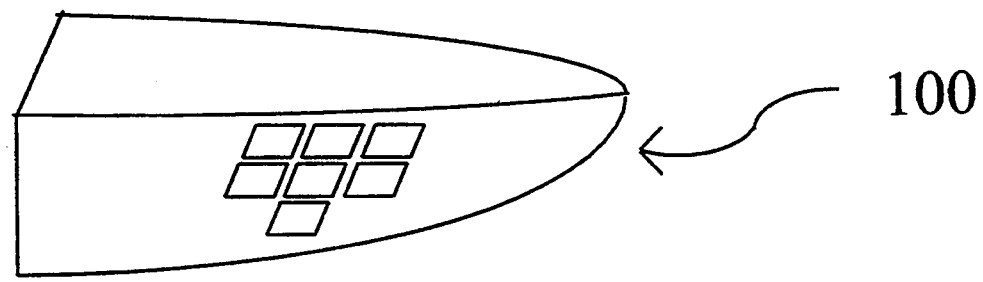

The closed loop state versus control cost of each controller designed, based on an assumed measurement noise of 3%, are plotted in FIG. 28 for the aluminum test article. The closed loop state cost, which is directly related to the RMS response of the outputs, and which measures the performance of each control design, was normalized by the open loop cost. Similarly, the control cost is directly related to the RMS response of the control inputs and is a measure of the amount of control used. Since the control cost is normalized by the maximum available control effort, a control cost of 1 indicated the actuators are near saturation and are most likely saturated at some frequencies in the control bandwidth. It was found that a stable reduced order compensator (relative state to control cost weighting $\rho = 1e^{-3}$) decreased the state cost by 97.2% (83.4%RMS) or 31.2 db (15.6 db RMS). As seen in the Figure, either model errors or actuator saturation prevented such performance from being achieved experimentally. However, the best controller implemented ($\rho = 1e^{-2}$) was able to reduce the state cost significantly. This reduced order compensator was analytically predicted to decrease the state cost by 97.1% (83.1% RMS) or 30.9 db (15.4 db RMS). It was found experimentally that this controller actually reduced the state cost by 96.3% (80.8% RMS) or 28.7 db (14.3 db RMS).

Such a large reduction in the state cost or RMS response is especially significant in light of the 500 Hz. bandwidth over which the cost was calculated, which included ten structural modes. The high-authority, high-bandwidth nature of this controller is further illustrated in FIG. 20. The Figure displays the frequency response of the open and closed loop analytical and experimental disturbance to sensor output ($Y_1/d$ and $Y^3/d$) transfer functions. As seen in the Figure, significant amounts of damping were introduced into the first four structural modes using this controller ($\rho = 1e^{-2}$), and none of the higher frequency modes were destabilized. The magnitude of the frequency response of the closed loop system was reduced from that of the open loop system (which is already 1.5% structural damping) by approximately 30, 10, 20, and 10 db in the first 4 modes, respectively.

While initial operation of the above described controllers was limited in its range of operating conditions, the method of implementing such controllers is of full generality and allows the introduction of new control laws to cover a greater range of conditions, for example as may be induced in wind tunnel experiments using variable angles of attack and extreme variation of wind speeds.

Figure 31:
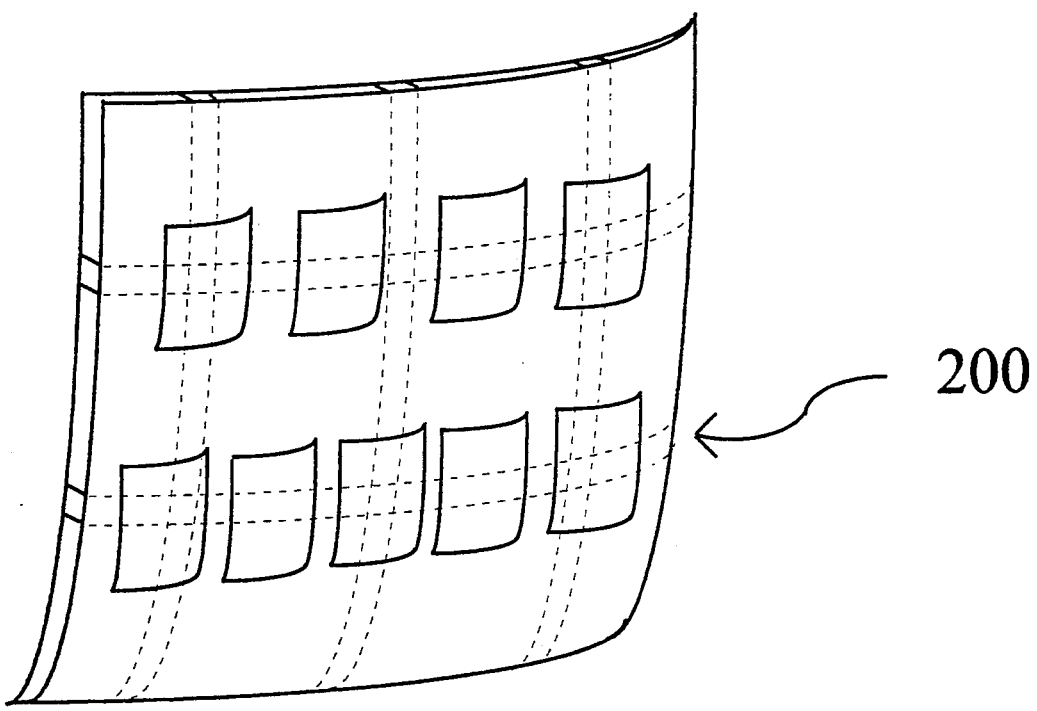
FIG. 31 illustrates a hull or fuselage in a system of the present invention.

The invention includes systems with sensors to control actuators in a hull or fuselage 100 (FIG. 31), or in a sail, panel or antenna 200 (FIG. 32) and a dynamic compensator embodying control laws applicable to those structures.

The invention being thus disclosed in a number of basic embodiments, variations and modifications will occur to those skilled in the art, and all such variations and modifications are considered to be within the spirit and scope of the invention, as defined by the claims appended hereto.

What is claimed is:

1. A system controlling disturbances and instabilities in a sheet structure having a surface contacting a surrounding fluid and dynamically interacting therewith, such system comprising a plurality of m actuators attached to the sheet structure, each actuator being located to couple energy into a control segment consisting of a region of said sheet structure about such actuator, a multi-channel amplifier having a plurality of n power outputs for separately driving ones of the m actuators, a plurality of s sensors located with respect to said sheet structure for sensing physical parameters associated with dynamics of the sheet structure and for producing sensing signals indicative thereof, m, n and s being positive integers, estimator means for receiving said sensing signals and determining therefrom estimated state variables descriptive of behavior of said sheet structure, and control means operative on ones of said sensing signals and on at least some of said estimated state variables for producing control outputs, said control outputs controlling the multi-channel amplifier to drive selected ones of the actuators with an amplitude to control a dynamic physical condition of said sheet structure.

2. A system according to claim 1, wherein the control means includes a processor that implements a state machine having machine states corresponding to states of said sheet structure, control states corresponding to processes for altering the machine states, and selecting means determined by said machine states and said control states for driving the selected ones of the actuators to achieve suppression or alleviation of an unwanted response of the sheet structure.

3. A system according to claim 1, wherein the sheet structure is a composite wing having an outside bounding surface, and said actuators are enclosed by said outside bounding surface.

4. A system according to claim 3, wherein the composite wing has an inside bounding surface, and said actuators are embedded between the inside bounding surface and the outside bounding surface.

5. A system according to claim 2, wherein said estimated state variables determined by said estimator means include amplitudes of lower order structural modes of said sheet structure or a combination thereof.

6. A system according to claim 5, wherein sensed physical parameters include at least one of temperature, surrounding fluid speed, pressure, structure displacement, strain, acceleration and strain rate.

7. A system according to claim 3, wherein a control law causes the actuators to transfer strain to the sheet structure in a manner to decrease load on the composite wing and produce gust alleviation.

8. A system according to claim 6, wherein the sheet structure is an outer fluid-contacting surface of a vessel hull.

9. A system according to claim 6, wherein the sheet structure is a sail.

10. A system according to claim 5, wherein the sheet structure is a panel.

11. A system according to claim 2, wherein some of said actuators are arranged to couple strain energy into regions of said sheet structure to excite bending and torsional modes of the structure.

12. A system according to claim 11, wherein the sheet structure extends from a root attached to a vessel, and said control means includes control laws for driving some of said actuators to decrease loading on the root.

13. A system according to claim 6, wherein the sheet structure is a vessel fuselage.

14. A system according to claim 5, wherein the sheet structure is an antenna.

15. A controllable sheet structure comprising a skin of a first material having a surface in contact with a surrounding fluid and in dynamic interaction therewith, and at least one actuator of a second material attached to said structure for coupling strain energy over a region into said structure, wherein mechanical impedance of each said actuator is matched to stiffness of said structure over the region to optimize coupling of strain energy thereto, and a dynamic compensator operative on sensed physical parameters of said structure for determining state variables and producing control outputs, said control outputs controlling outputs of a multi-channel amplifier in accordance with the determined state variables to drive selected ones of the actuators with an amplitude to control a dynamic physical condition of said sheet structure.

* * * * *